United States Patent
Kazumi

(10) Patent No.: US 12,348,684 B2
(45) Date of Patent: Jul. 1, 2025

(54) INSPECTION APPARATUS, METHOD OF CONTROLLING THE SAME, AND STORAGE MEDIUM

(71) Applicant: CANON KABUSHIKI KAISHA, Tokyo (JP)

(72) Inventor: Ryo Kazumi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 547 days.

(21) Appl. No.: 17/698,094

(22) Filed: Mar. 18, 2022

(65) Prior Publication Data

US 2022/0303398 A1 Sep. 22, 2022

(30) Foreign Application Priority Data

Mar. 22, 2021 (JP) ................................ 2021-047530

(51) Int. Cl.
*H04N 1/00* (2006.01)
*G06T 7/00* (2017.01)

(52) U.S. Cl.
CPC ......... *H04N 1/00037* (2013.01); *G06T 7/001* (2013.01); *H04N 1/00254* (2013.01); *G06T 2207/10008* (2013.01); *G06T 2207/30176* (2013.01)

(58) Field of Classification Search
None
See application file for complete search history.

(56) References Cited

U.S. PATENT DOCUMENTS

| 2013/0223866 | A1  | 8/2013  | Kazama et al. |
| 2018/0059603 | A1  | 3/2018  | Miyahara |
| 2020/0051231 | A1* | 2/2020  | Tsukamoto ........ H04N 1/00063 |
| 2021/0034310 | A1  | 2/2021  | Ikuno |
| 2023/0308548 | A1* | 9/2023  | Azuma .................. G06F 3/121 |
| 2023/0328186 | A1* | 10/2023 | Azuma .............. H04N 1/00005 |
|              |     |         | 358/1.13 |

FOREIGN PATENT DOCUMENTS

| JP | 2010041430 A | 2/2010 |
| JP | 2013171570 A | 9/2013 |
| JP | 2018031963 A | 3/2018 |
| JP | 2021024183 A | 2/2021 |

* cited by examiner

*Primary Examiner* — Dov Popovici
(74) *Attorney, Agent, or Firm* — ROSSI, KIMMS & McDOWELL LLP

(57) ABSTRACT

The present invention provides an inspection apparatus that compares a reference image with a printed material that has been printed to perform inspection of the printed material, and a method of controlling the same. The inspection apparatus exclusively controls, as an inspection mode of the inspection, an inspection mode between a mode for switching a discharge destination of a printed material in which a defect is recognized, and an inspection job of inspecting a printed material printed by a print job in which one copy includes a plurality of printed materials or an inspection type of inspecting printed materials having a sequential order.

17 Claims, 25 Drawing Sheets

FIG. 4A

WHEN VARIABLE PRINT JOB IS CORRECT

| ORIGINAL DATA | INSPECTION RESULT | PRINTED PRODUCT | ADDRESS |
|---|---|---|---|
| Mr. A | Mr. A ··· OK | Mr. A | Mr. A |
| Mr. B | Mr. B ··· OK | Mr. B | Mr. B |
| Mr. C | Mr. C ··· OK | Mr. C | Mr. C |
| Mr. D | Mr. D ··· OK | Mr. D | Mr. D |
| Mr. E | Mr. E ··· OK | Mr. E | Mr. E |
| Mr. F | Mr. F ··· OK | Mr. F | Mr. F |
| ... | ... | ... | ... |

WHEN BAD OCCURS IN INSPECTION RESULT OF VARIABLE PRINT JOB

| ORIGINAL DATA | INSPECTION RESULT | PRINTED PRODUCT | ADDRESS |
|---|---|---|---|
| Mr. A | Mr. A ··· OK | Mr. A | Mr. A |
| Mr. B | Mr. B ··· OK | Mr. B | Mr. B |
| Mr. C | Mr. C ··· OK | Mr. D ↔ | Mr. C |
| Mr. D | Mr. D ··· OK | Mr. E ↔ | Mr. D |
| Mr. E | Mr. E ··· OK | Mr. F ↔ | Mr. E |
| Mr. F | Mr. F ··· OK | Mr. G ↔ | Mr. F |
| ... | ... | ... | ... |

FIG. 4B

WHEN PRINT JOB OF PLURALITY OF SHEETS IS CORRECT

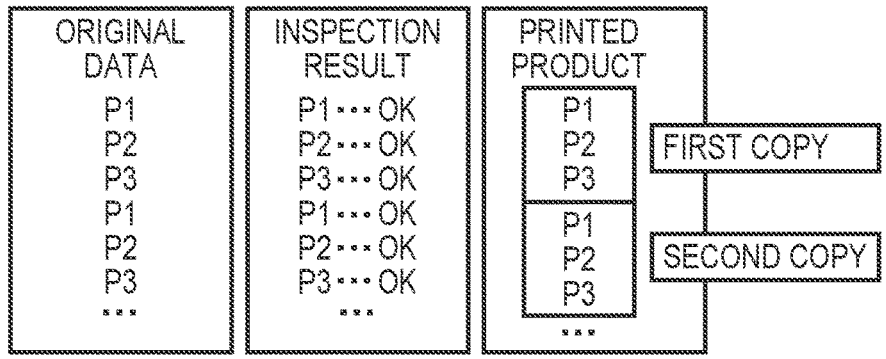

WHEN BAD OCCURS IN INSPECTION RESULT OF PRINT JOB OF PLURALITY OF SHEETS

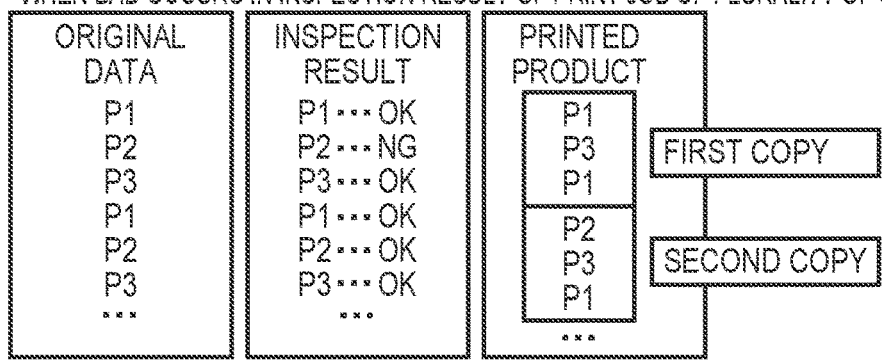

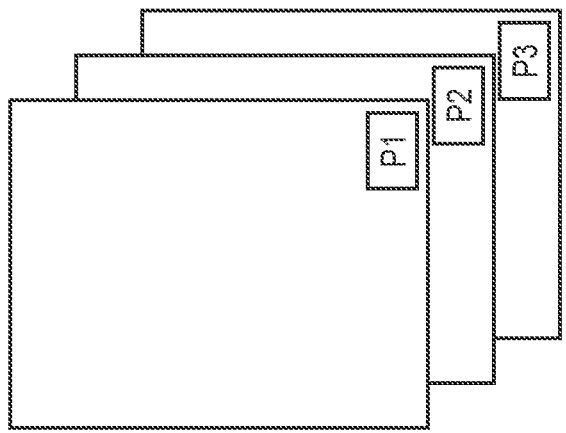
FIG. 5A  PRINT CONSISTENCY CHECK
FIG. 5B  DATA MATCHING CHECK

FIG. 10

| | |
|---|---|
| JOB SETTING | |
| 1001 — JOB ID: | 00000001 |
| 1002 — INSPECTION JOB NAME: | NEW INSPECTION JOB |
| 1003 — NUMBER OF SHEETS PER ONE COPY: | 5 |
| 1004 — NUMBER OF PRINT COPIES: | 100 |
| 1005 — SHEET SIZE: | A4 |

OK — 1006
CANCEL — 1007

FIG. 12

| | ITEM | VALUE |
|---|---|---|
| APPLICATION SETTING | INSPECTION MODE | SELECT FROM<br>• PURGE MODE<br>• PURGE & RECOVERY MODE<br>• LOG ONLY MODE |
| INSPECTION JOB SETTING | INSPECTION JOB NAME | SET WHEN INSPECTION JOB IS NEWLY CREATED |
| | NUMBER OF SHEETS PER ONE COPY | SET WHEN INSPECTION JOB IS NEWLY CREATED |
| | NUMBER OF PRINT COPIES | SET WHEN INSPECTION JOB IS NEWLY CREATED |
| | SHEET SIZE | SET WHEN INSPECTION JOB IS NEWLY CREATED |
| | AREA SETTING ARRANGEMENT | SETTING ARRANGEMENT OF EACH AREA |

| | ITEM | VALUE |
|---|---|---|
| AREA SETTING | AREA ID | SPECIFIC ID OF EACH AREA |
| | COORDINATE INFORMATION | UPPER LEFT COORDINATES, SIZE |
| | TYPE OF READERS | ONE FROM<br>• GLYPH FILE<br>• BAR CODE READER FILE |
| | INSPECTION TYPE | SELECT FROM<br>• PRINT CONSISTENCY CHECK<br>• DATA READABILITY CHECK<br>• DATA MATCHING CHECK |
| | REFERENCE DATA | CSV DATA PASS OR START PAGE NUMBER |

INSPECTION APPARATUS, METHOD OF CONTROLLING THE SAME, AND STORAGE MEDIUM

BACKGROUND OF THE INVENTION

Field of the Invention

The present invention relates to an inspection apparatus, a method of controlling the same and a storage medium.

Description of the Related Art

An inspection apparatus that reads a printed material obtained by printing on a printing apparatus, and inspecting the quality of the printed material is known. The inspection apparatus can detect image defects such as a blot on a printed material and missing of printing, errors of characters, and quality of barcodes. Therefore, some inspection types exist according to these defect targets to be detected. Examples of this inspection type include an inspection to check whether printed characters are correct, and an inspection to check quality of a printed barcode.

When a printed material in which a defect of the printed material has been detected and the inspection result has become bad and a printed material in which no defect has been detected are discharged to the same discharge destination, it is not possible to recognize which printed material has the bad inspection result. Japanese Patent Laid-Open No. 2010-41430 describes that when a printed product with a bad inspection result is detected, only the bad printed product (sheet) is discharged to a discharge destination different from a discharge destination to which a printed product (sheet) with no defect is discharged.

However, as for a bundle of printed products from which a sheet determined to be bad is missing, for example, in a case where the order of the printed products is important, even if the bundle of printed products has no defect detected, the order of the printed products is not necessarily guaranteed. Therefore, there is a problem that convenience is not good for a user who handles such printed products.

SUMMARY OF THE INVENTION

An aspect of the present invention is to eliminate the above-mentioned problem with conventional technology.

A feature of the present invention is to provide a technique not to switch a discharge destination of a printed material, when the inspection result of the printed material has been determined to be bad, in a case where there is an order in the printed material.

According to a first aspect of the present invention, there is provided an inspection apparatus configured to compare a reference image with a printed material that has been printed to perform inspection of the printed material, the inspection apparatus comprising: one or more processors and one or more memories being configured to: exclusively control, as an inspection mode of the inspection, the inspection mode between a mode for switching a discharge destination of a printed material in which a defect is recognized, and an inspection job of inspecting a printed material printed by a print job in which one copy includes a plurality of printed materials or an inspection type of inspecting printed materials having a sequential order.

According to a second aspect of the present invention, there is provided a method of controlling an inspection apparatus that compares a reference image with a printed material that has been printed to perform inspection of the printed material, the control method comprising: exclusively controlling, as an inspection mode of the inspection, the inspection mode between a mode for switching a discharge destination of a printed material in which a defect is recognized, and an inspection job of inspecting a printed material printed by a print job in which one copy includes a plurality of printed materials or an inspection type of inspecting a printed material having a sequential order.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B depict views illustrating examples of a failure due to an occurrence of bad in a printed product of a print job having a sequential order.

FIGS. 5A and 5B depict views illustrating an example of another failure due to an occurrence of bad in a printed product of a print job having a sequential order.

FIG. 10 depicts a view illustrating an example of a setting screen displayed on the display unit when a new job is created in the inspection apparatus according to the first exemplary embodiment.

FIG. 12 depicts a view illustrating an example of parameters used for setting an inspection job in the inspection apparatus according to the first exemplary embodiment.

FIG. 14 depicts a view illustrating an example of a setting screen for setting an inspection area of an image and a reader when inspection is performed in an inspection job in the inspection apparatus according to the first exemplary embodiment.

FIG. 20 depicts a view illustrating an example of a screen for setting an inspection job displayed on the display unit of the inspection apparatus in step S1909 of FIG. 19.

FIG. 22 depicts a view illustrating an example of a screen for setting an inspection job displayed on the display unit of the inspection apparatus in step S2104 of FIG. 21.

FIG. 24 depicts a view illustrating an example of a screen for setting an inspection type displayed on the display unit of the inspection apparatus in step S2308 of FIG. 23.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Unless otherwise specified, it goes without saying that the present invention can be applied to even an inspection apparatus that is connected via a network such as a local area network (LAN) or a wide area network (WAN) and performs processing as long as the functions of the present invention are archived. That is, it goes without saying that the system configuration to which various terminals described in the following exemplary embodiments are connected is an example, and there are various configuration examples depending on the application and purpose.

First Exemplary Embodiment

Figure 1:
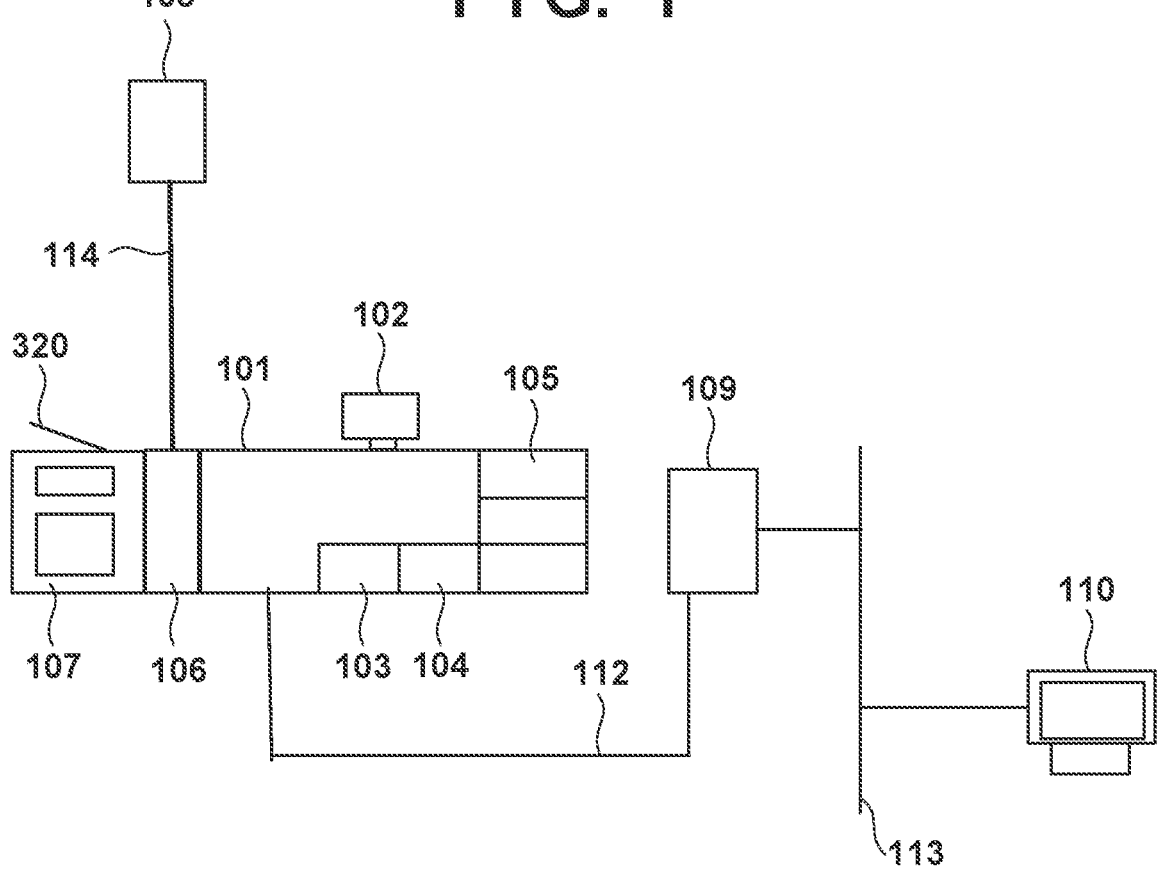
FIG. 1 depicts a view illustrating a schematic configuration of an inspection system according to a first exemplary embodiment of the present invention.

FIG. 1 depicts a view illustrating a schematic configuration of an inspection system according to a first exemplary embodiment of the present invention. This inspection system includes an information processing apparatus, an inspection apparatus, and a printing apparatus. A printing apparatus 101 according to the first exemplary embodiment will be described with reference to an electrophotographic printing apparatus, but this printing apparatus may also be a printing apparatus of a different type of an image forming apparatus such as an inkjet apparatus or an offset system.

The printing apparatus 101 is connected to an information processing apparatus 109 via a cable 112. The information processing apparatus 109 is connected to a client computer 110 via a network 113. The printing apparatus 101 includes a user interface (UI) panel 102, a sheet feed deck 103, and a sheet feed deck 104. Furthermore, an optional deck 105 including three stages of sheet feed decks is connected. The UI panel 102 is a user interface including a touch panel of an electrostatic capacitance method, for example. Furthermore, the printing apparatus 101 includes an inspection unit 106 and a large volume stacker 107. The inspection unit 106 is connected to an inspection apparatus 108 via a cable 114. The large volume stacker 107 includes a main tray and a top tray, and several thousand sheets can be stacked on the main tray at a time.

A print job is generated by the client computer 110, transmitted to the information processing apparatus 109 via the network 113, and managed by the information processing apparatus 109. Then, the print job is transmitted from the information processing apparatus 109 to the printing apparatus 101 through the cable 112, and the printing apparatus 101 prints on a sheet according to the print job. Note that the print job may be generated and managed by the information processing apparatus 109, transmitted to the printing apparatus 101 via the network 112, and managed by the printing apparatus 101.

The information processing apparatus 109 also manages a file in which variable data such as a CSV file used for creating a job in a client computer is described. Note that, in the first exemplary embodiment, variable data will be described as a CSV format file (CSV file). This CSV file is transmitted to the information processing apparatus 109 via the network 113 and managed by the information processing apparatus 109. Note that the CSV file may be transmitted to the printing apparatus 101 via the network 113 and managed by the inspection apparatus 108.

Note that the client computer 110, the information processing apparatus 109, and the inspection apparatus 108 may be connected to the cable 112 to be communicable with the printing apparatus 101. The inspection apparatus 108 may also be connected to the information processing apparatus 109 and the client computer 110 via the network 113. That is, it goes without saying that the connection form of the printing apparatus 101, the information processing apparatus 109, and the client computer 110 illustrated in FIG. 1 is an example, and there are various connection forms other than those illustrated in the first exemplary embodiment.

In addition to the inspection unit 106 and the large volume stacker 107, a finisher that can staple, a folding machine, a bookbinding machine, and the like may be connected to the printing apparatus 101.

Figure 2:
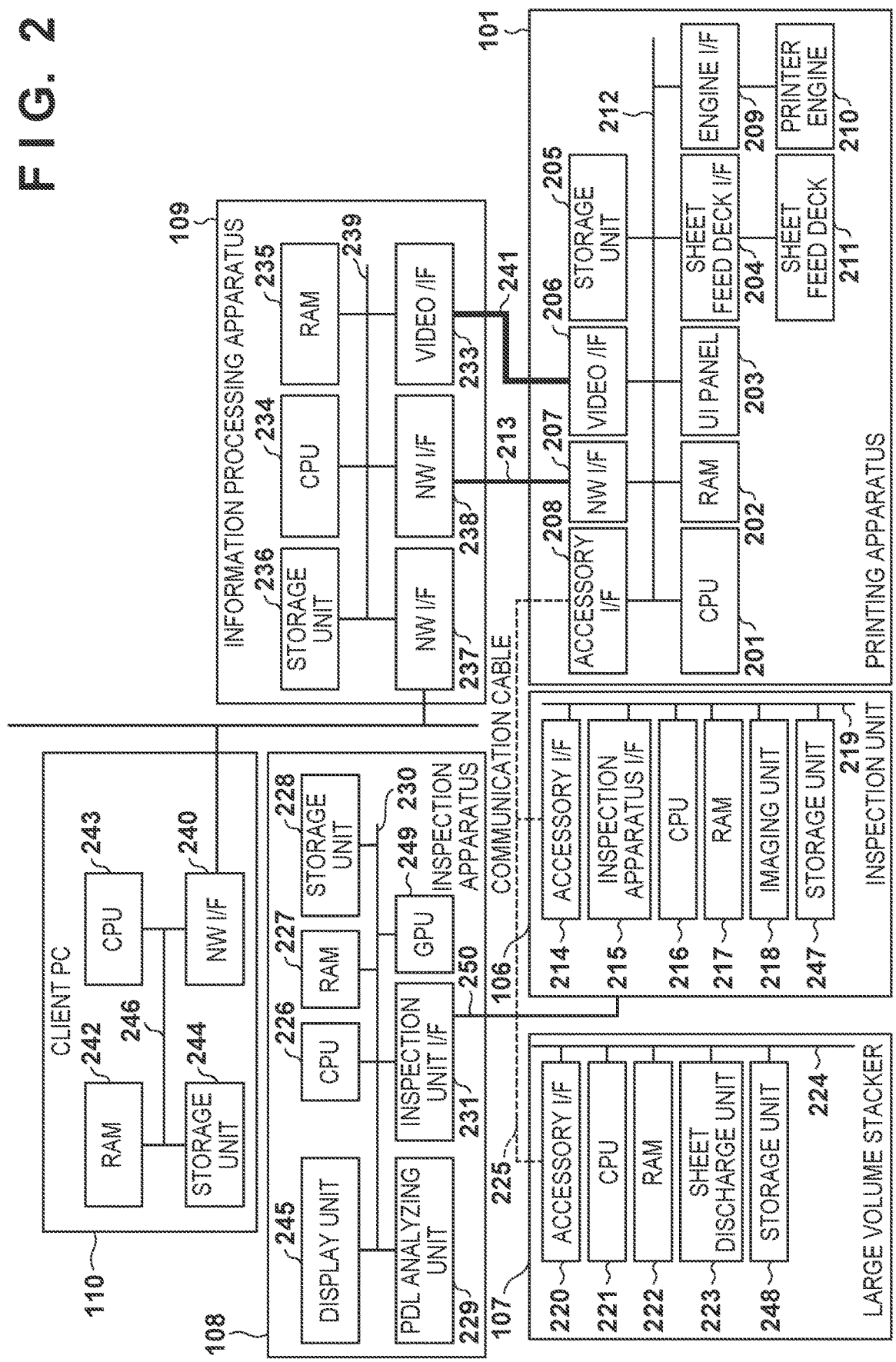
FIG. 2 is a block diagram for describing a control configuration of a printing apparatus, an inspection apparatus, a large volume stacker, an information processing apparatus, and a client computer according to the first exemplary embodiment.

FIG. 2 is a block diagram for describing the control configuration of the printing apparatus 101, the inspection apparatus 108, the large volume stacker 107, the information processing apparatus 109, and the client computer 110 according to the first exemplary embodiment.

First, the printing apparatus 101 will be described.

A central processing unit (CPU) 201 manages control and arithmetic operations in each unit in the printing apparatus 101 via a system bus 212. The CPU 201 manages execution of a program stored in a storage unit 205 and deployed in a random access memory (RAM) 202. The RAM 202 is a type of general volatile storage device that can be directly accessed from the CPU 201, and is used as a work area of the CPU 201 and other temporary data storage areas. The storage unit 205 stores a program of the printing apparatus 101 and various data.

An engine I/F 209 manages communication with and control of a printer engine 210. A sheet feed deck I/F 204 manages communication with and control of a sheet feed deck 211. The sheet feed deck 211 is a collective name of the sheet feed decks 103 and 104 and the optional deck 105 illustrated in FIG. 1 as a hardware configuration. An UI (User Interface) panel 203 is a hardware configuration of the UI panel 102, and is a user interface for performing the overall operation of the printing apparatus 101. In the first exemplary embodiment, it is assumed that the UI panel 203 includes a touch panel of the electrostatic capacitance method.

A network interface (NW I/F) 207 is connected to an NW I/F 238 of the information processing apparatus 109 via a cable 213, and manages communication between the information processing apparatus 109 and the printing apparatus 101. Note that in this example, the interfaces connected to the system bus are directly connected to each other, but the information processing apparatus 109 and the printing apparatus 101 may be connected by, for example, a network, and the connection form is not limited. A video I/F 206 is connected to a video I/F 233 of the information processing apparatus 109 via a video cable 241, and manages communication of image data between the information processing apparatus 109 and the printing apparatus 101.

Note that the connection interface with the printing apparatus 101 in the information processing apparatus 109 may integrate the functions of the NW I/F 238 and the video I/F 233. The connection interface with the information processing apparatus 109 in the printing apparatus 101 may integrate the functions of the NW I/F 207 and the video I/F 206.

An accessory I/F 208 is connected to an accessory I/F 214 of the inspection unit 106 and the and an accessory I/F 220 of the large volume stacker 107 via a cable 225. That is, the printing apparatus 101 communicates with the inspection unit 106 and the large volume stacker 107 to one another via the accessory I/Fs 208, 214, and 220.

Next, the inspection unit 106 will be described.

A CPU 216 executes a program stored in a storage unit 247 and deployed in a RAM 217, and performs control and arithmetic operations in each unit in the inspection unit 106 via a system bus 219. The RAM 217 is a type of general volatile storage device that can be directly accessed from the CPU 216, and is used as a work area of the CPU 216 and other temporary data storage areas. The storage unit 247 functions as a temporary storage area and a work memory during the operation of the inspection apparatus 106. An inspection apparatus I/F 215 is connected to an inspection apparatus unit I/F 231 of the inspection apparatus 108 via a cable 250. That is, the inspection unit 106 communicates with the inspection apparatus 108 via the inspection apparatus I/F 215 and the inspection unit I/F 231.

An imaging unit 218 includes an imaging function equipped with a contact image sensor (CIS), for example, shoots a sheet passing through in the inspection unit 106, and transmits shot image data to the inspection apparatus 108 via the inspection apparatus I/F 215. Note that the CIS for the imaging unit 218 is an example of a sensor, and may be another type of sensor such as a CCD image sensor, and the imaging method is not limited.

Next, the large volume stacker 107 will be described.

A CPU 221 executes a program stored in a storage unit 248 and deployed in a RAM 222, and executes control of each unit in the large volume stacker 107 via a system bus 224. The RAM 222 is a type of general volatile storage device that can be directly accessed from the CPU 221, and is used as a work area of the CPU 221 and other temporary data storage areas. The storage unit 248 functions as a temporary storage area and a work memory during the operation of the large volume stacker 107. A sheet discharge unit 223 manages a sheet discharge operation to the main tray and the top tray, and monitoring and control of a stack state of each of the main tray and the top tray.

Next, the inspection apparatus 108 will be described.

A CPU 226 executes a program stored in a storage unit 228 and deployed in a RAM 227, and manages control and arithmetic operations in each unit in the inspection apparatus 108 via a system bus 230. The RAM 227 is a type of general volatile storage device that can be directly accessed from the CPU 226, and is used as a work area of the CPU 226 and other temporary data storage areas. The storage unit 228 functions as a temporary storage area for a program and various data of the inspection apparatus 108. A PDL analyzing unit 229 reads PDL data such as PDF, PostScript, and PCL received from the client computer 110 or the information processing apparatus 109, and executes interpretation processing. A display unit 245 is a display connected to the inspection apparatus 108, for example, and receives an operator input to the inspection apparatus 108 and displays the state of the inspection apparatus 108. A graphics processing unit (GPU) 249 performs calculation of image processing in the inspection apparatus 108 at high speed.

Next, the information processing apparatus 109 will be described.

A CPU 234 executes a program stored in a storage unit 236 and deployed in a RAM 235, and executes control and arithmetic operations in each unit in the information processing apparatus 109 via a system bus 239. The RAM 235 is a type of general volatile storage device that can be directly accessed from the CPU 234, and is used as a work area of the CPU 234 and other temporary data storage areas. The storage unit 236 stores various programs executed by the CPU 234 of the information processing apparatus 109. A network interface (NW I/F) 237 is connected to an NW I/F 240 of the client computer 110 via a network and communicates with the client computer 110.

Note that in the description the first exemplary embodiment, the information processing apparatus 109 and the inspection apparatus 108 do not communicate with each other. However, the form of the first exemplary embodiment is an example, and the inspection apparatus 108 may include an NW I/F, and the information processing apparatus 109 may communicate with the inspection apparatus 108 via the NW I/F of the inspection apparatus 108 and the NW I/F 237.

Next, the client computer 110 will be described.

A CPU 243 executes a program stored in a storage unit 244 and deployed in a RAM 242, and manages control and arithmetic operations in each unit in the client computer 110 via a system bus 246. The RAM 242 is a type of general volatile storage device that can be directly accessed from the CPU 243, and is used as a work area of the CPU 243 and other temporary data storage areas. The storage unit 244 functions as a storage area for programs and the like executed by the CPU 243.

Figure 3:
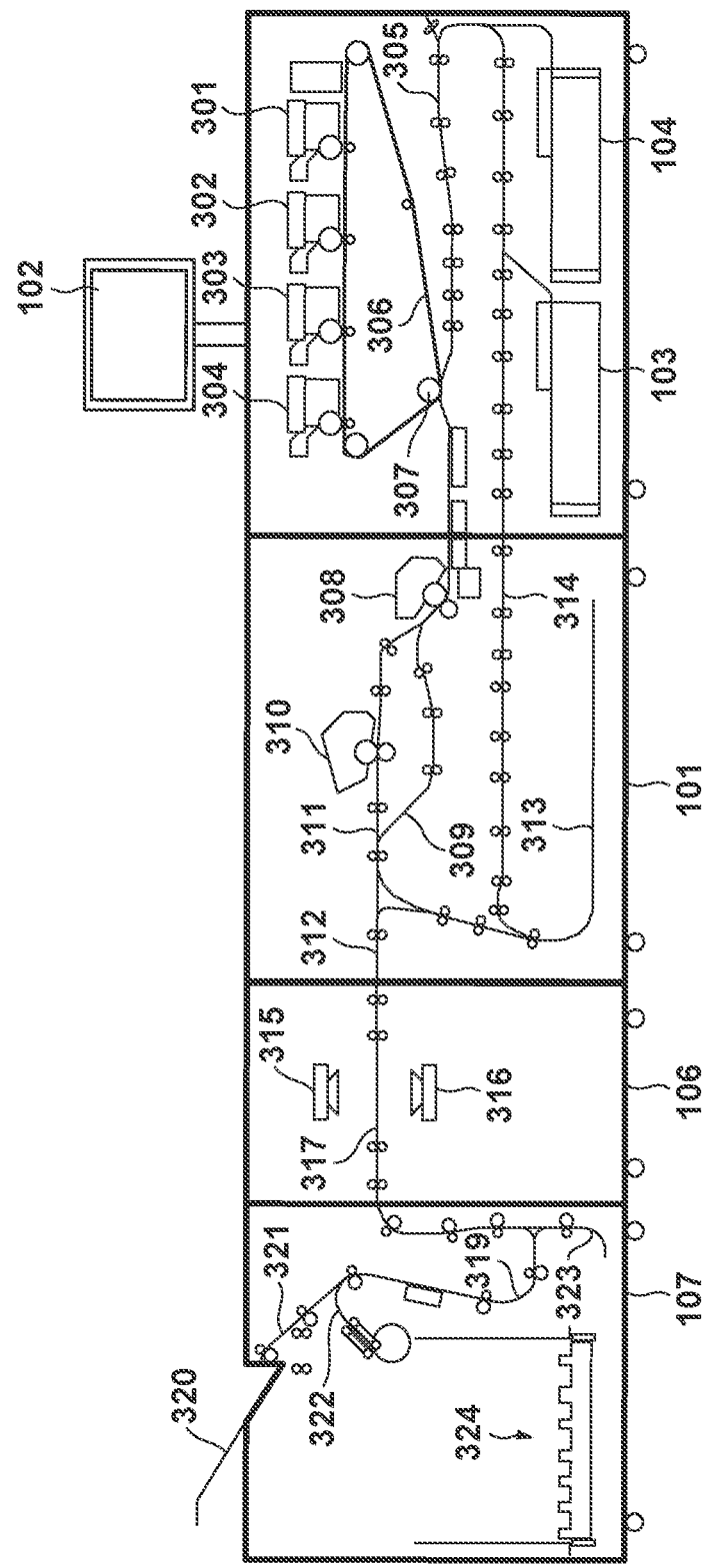
FIG. 3 depicts a schematic sectional view illustrating an internal configuration of the printing apparatus, the inspection unit, and the large volume stacker according to the first exemplary embodiment.

FIG. 3 depicts a schematic sectional view illustrating an internal configuration of the printing apparatus 101, the inspection unit 106, and the large volume stacker 107 according to the first exemplary embodiment.

The printing apparatus 101 receives a user input via the UI panel 102, and displays the state of printing and equipment. The sheet feed decks 103 and 104 can store various sheets. Each sheet feed deck can separate only the uppermost one sheet of the stored sheets and convey the uppermost sheet to a sheet conveyance path 305. In order to form color images, development stations 301 to 304 form toner images using Y, M, C, and K color toners, respectively. The toner images formed here are primarily transferred to an intermediate transfer belt 306 to form a full color toner image on the intermediate transfer belt 306. The intermediate transfer belt 306 rotates clockwise in FIG. 3, and the full color toner image is transferred to the sheet conveyed from the sheet conveyance path 305 at a secondary transfer position 307. A fixing unit 308 includes a pressure roller and a heating roller, and when the sheet passes through between the rollers, the fixing unit 308 melts and presses the toner to fix the full color toner image on the sheet. The sheet having passed through the fixing unit 308 is conveyed to a conveyance path 312 through the sheet conveyance path 309. In a case where further melting and pressing are required for fixing depending on the type of sheet, the sheet having passed through the fixing unit 308 is conveyed to a second fixing unit 310 using an upper sheet conveyance path, and after additional melting and pressing are performed, the sheet is conveyed to the conveyance path 312 through a sheet conveyance path 311. Here, in a case of two-sided printing, the sheet on which one side is printed is conveyed to a reversing path 313, where the sheet is reversed, then conveyed to a two-sided conveyance path 314, and image transfer of the second side is performed at the secondary transfer position 307.

In the inspection unit 106, CISs 315 and 316 are arranged to oppose each other. The CIS 315 is a sensor for reading the upper surface of the sheet, and the CIS 316 is a sensor for reading the lower surface of the sheet. The inspection unit 106 scans the sheet using the CISs 315 and 316 at a timing when the sheet conveyed to the sheet conveyance path 317 reaches a predetermined position. Image data obtained by scanning is transmitted to the inspection apparatus 108 via the inspection apparatus I/F 215 and the inspection unit I/F 231. The CPU 226 of the inspection apparatus 108 determines whether or not there is a defect in the received image data, and notifies the inspection unit 106 of the determination result again via the inspection unit I/F 231 and the inspection apparatus I/F 215. By this, the CPU 216 of the inspection unit 106 notifies the large volume stacker 107 of the received determination result via the accessory I/Fs 214 and 220.

The large volume stacker 107 includes a main tray 324 as a tray on which sheets are stacked. The sheet having passed through the inspection unit 106 enters the large volume stacker 107 through a sheet conveyance path 319. Sheets are stacked on the main tray 324 from the sheet conveyance path 319 via a sheet conveyance path 322. The large volume stacker 107 further includes a top tray 320 as a sheet discharge tray. The CPU 221 of the large volume stacker 107 discharges, to the top tray 320, the sheet on which the defect has been detected by the inspection apparatus 108. In a case where the sheet is discharged to the top tray 320, the sheet is conveyed from the sheet conveyance path 319 to the top tray 320 via a sheet conveyance path 321. A reversing unit 323 reverses the sheet. This reversing unit 323 is used when sheets are to be stacked on the main tray 324. The reversing unit 323 reverses the sheets once when the sheets are to be stacked on the main tray 324 such that the orientation of the incoming sheets and the orientation of the sheets at the time of stacking are the same. In the case of conveyance to the top tray 320, since the sheet is discharged as it is without being flipped at the time of stacking, the reversing unit 323 does not perform the reversing operation.

In the first exemplary embodiment, a variable print job and a print job of a plurality of sheets will be described as examples of print jobs having a sequential order of printed products.

FIGS. 4A and 4B depict views illustrating examples of a failure due to an occurrence of bad in a printed product of a print job having a sequential order.

FIG. 4A illustrates a case of a variable print job. This variable printing is, for example, a job of printing different numbers and texts for each sheet. For example, identifiable customer names are respectively printed on a first sheet, a second sheet, and a third sheet. Therefore, in the case of delivering the sheet, if the sheet in the middle is missing due to being bad, the printed product is sent to a wrong address. In the example of FIG. 4A, since bad is detected in the printed material addressed to Mr. C, the printed product addressed to Mr. C is missing in the printed product. On this occasion, if addresses are printed in the initial order, the address of Mr. C is printed on the printed product addressed to Mr. D. This is difficult for the user to use, and it is assumed to be desirable that the order of printed products is maintained.

FIG. 4B illustrates a case of a print job in which one copy includes a plurality of sheets. The print job in which one copy includes a plurality of sheets is a print job in which the number of sheets per one copy is two or more. At this time, if the second sheet (P2), for example, of the plurality of sheets of one copy becomes bad and is removed, a sheet bundle in which a wrong sheet is stapled is obtained in a post-processing apparatus such as a subsequent staple. Therefore, at the end of printing, it is necessary for the user to manually reprint the sheet whose inspection result is bad and insert the reprinted sheet into the place from which the sheet has been removed. Therefore, it is difficult for the user to use. Hence, it is assumed to be desirable that the order of printed products is maintained at the end of printing.

FIGS. 5A and 5B depict views illustrating an example of another failure due to an occurrence of bad in a printed product of a print job having a sequential order.

Even when a print consistency check and a data matching check are performed as the inspection items of the inspection, it is assumed to be desirable that the order of the printed products is maintained similarly to the variable print job. FIG. 5A depicts a view illustrating an example of the print consistency check, where it is inspected whether the order is a preset numerical order. For example, it is inspected whether P1 is printed on the first sheet, P2 is printed on the second sheet, and P3 is printed on the third sheet.

FIG. 5B depicts a view illustrating an example of the data matching check. Here, it is checked whether the character string matches between the original data and the inspection target. For example, the original data is a number for identifying an individual, and it is inspected whether the number is printed. In the data matching check, for example, in a case where the inspection is performed for each sheet and the inspected sheet is put in an envelope for which the order is maintained, the order of the printed product needs to be maintained. The example of FIG. 5B illustrates an example in which a bill for a used amount of tap water is issued in correspondence with the number identifying an individual.

In the first exemplary embodiment, the case of discharging to the top tray 320 of the large volume stacker 107 is referred to as "purging". In the first exemplary embodiment, purging is performed according to the flowchart described in FIGS. 6A and 6B.

Figure 6A:
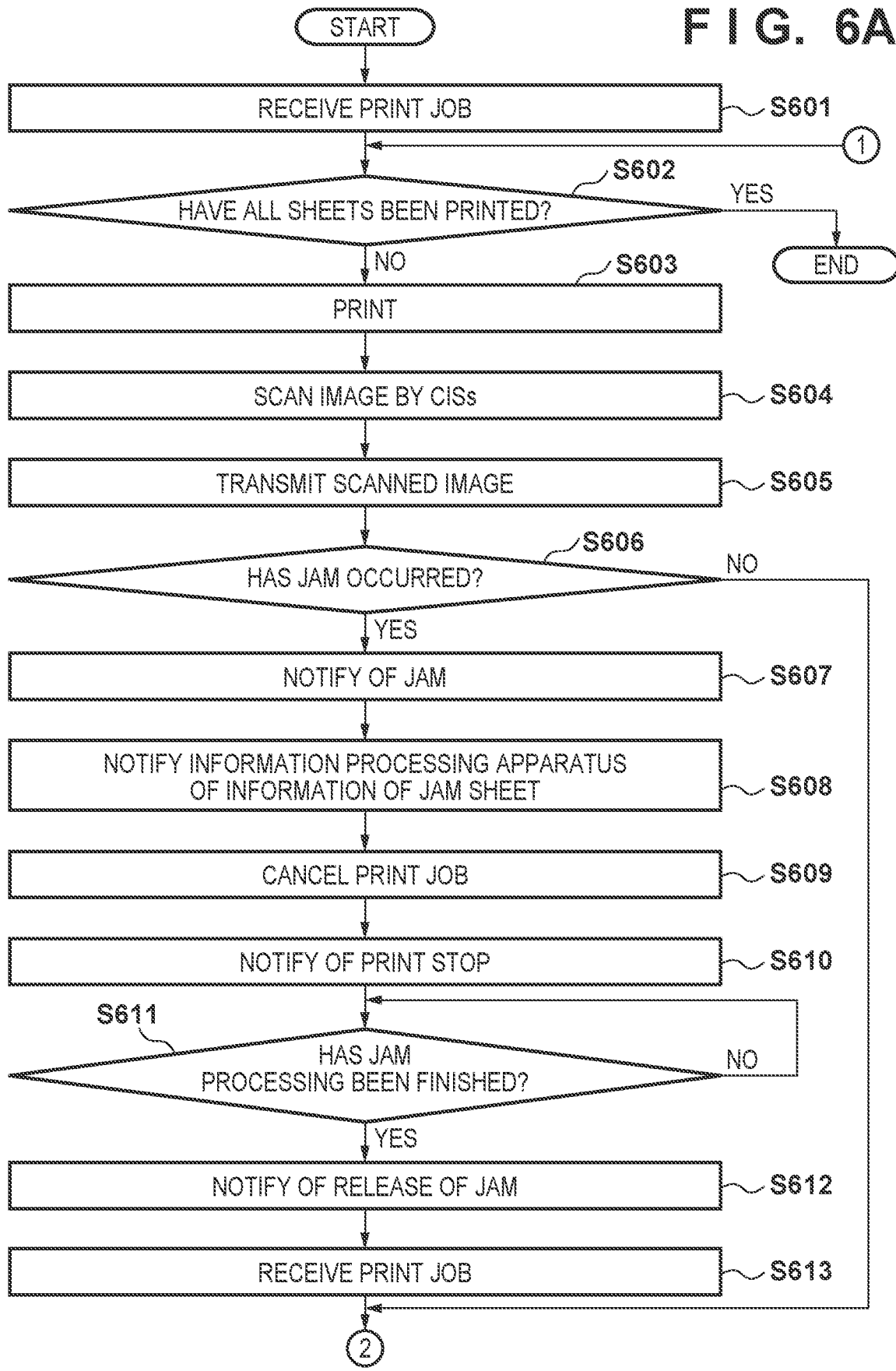
FIGS. 6A and 6B are flowcharts for explaining print and inspection processing by the printing apparatus according to the first exemplary embodiment.
Figure 6B:
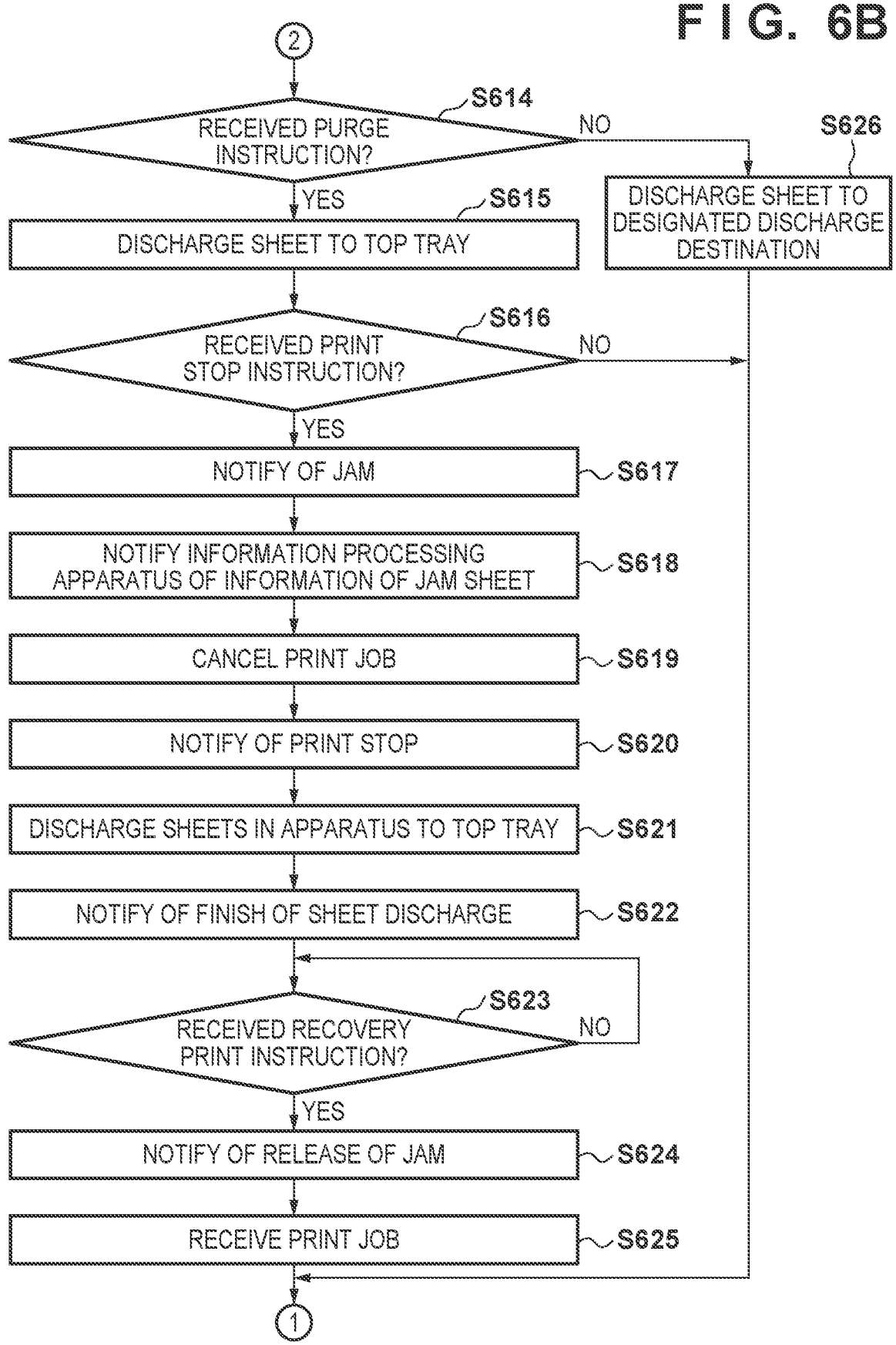

FIGS. 6A and 6B are flowcharts for explaining print and inspection processing by the printing apparatus 101 according to the first exemplary embodiment. Note that in the processing described in this flowchart, the processing of the printing apparatus 101 is achieved in such a manner that the CPU 201 executes a program deployed in the RAM 202, and the processing of the inspection unit 106 is achieved in such a manner that the CPU 216 executes a program deployed in the RAM 217.

In step S601, the CPU 201 of the printing apparatus 101 receives the print job from the information processing apparatus 109 and starts printing. Next, the process proceeds to step S602, and the CPU 201 determines whether or not printing of all the sheets to be printed by the print job has been finished. The process proceeds to step S603 if the printing has not been finished, and the process is finished if the printing has been finished. In step S603, the CPU 201 prints an image on the sheet according to the print job.

Next, the process proceeds to step S604, and the CPU 216 of the inspection unit 106 receives the sheet printed by the printing apparatus 101, and scans the image printed on the sheet by the CIS 315 and the CIS 316. Next, the process proceeds to step S605, and the CPU 216 transmits the image data, obtained by the scan in step S604, via the inspection apparatus I/F 215 to the inspection apparatus 108 via the inspection unit I/F 231.

Next, in step S606, the CPU 201 of the printing apparatus 101 determines whether or not a jam has been detected, and if a jam has been detected, the process proceeds to step S607. At this time, the jam may occur anywhere inside the printing apparatus 101, the inspection unit 106, and the large volume stacker 107, and the place thereof is not limited. When the jam occurs in the inspection unit 106 or the large volume stacker 107, the CPU 201 of the printing apparatus 101 obtains the jam information or the jam position via the accessory I/Fs 214, 220, and 208.

In step S607, the CPU 201 of the printing apparatus 101 notifies the CPU 216 of the inspection unit 106 and the CPU 221 of the large volume stacker 107 of the jam state via the accessory I/Fs 208, 214, and 220. This jam state includes position information on a jam that can be determined by a sensor (not illustrated) inside the printing apparatus 101, the inspection unit 106, or the large volume stacker 107 detecting the sheet. Since the CPU 201 can detect that the sheet discharge has been completed when the sheet is printed and discharged to the outside of the printing apparatus 101, it is possible to detect which sheet is jammed. Therefore, information on the sheet in which the jam has occurred is also included in the jam state.

Next, the process proceeds to step S608, and the CPU 201 notifies the information processing apparatus 109 of the state of the jam via the NW I/F 207 and the NW I/F 238. This enables the information processing apparatus 109 to find which one of the sheets used in the print job has jammed, i.e., from where to perform recovery printing. Next, the process proceeds to step S609, and the CPU 201 of the printing apparatus 101 cancels the print job being executed. Next, the process proceeds to step S610, and the CPU 201 instructs the inspection unit 106 and the large volume stacker 107 via the accessory I/Fs 214, 208, and 220 to discharge the sheet already fed from the sheet feed decks 103 and 104 and present on the sheet conveyance path to an evacuation space in the printing apparatus 101, the top tray 320, or the like. After the sheet is evacuated in step S610, the CPU 201 transmits print stop information to the inspection unit 106 and the large volume stacker 107 via the accessory I/Fs 208, 214, and 220. Then, in step S611, the CPU 201 waits until all the jammed sheets in the printing apparatus 101 are processed. When the jam occurs in this manner, the execution of the print job is stopped until the processing for the jam is finished in steps S607 to S611.

When all the jammed sheets in the printing apparatus 101 are processed in this manner, the process proceeds to step S612, and the CPU 201 notifies, via the accessory I/Fs 208, 214, and 220, the inspection unit 106 and the large volume stacker 107 of the release of the jam. The CPU 201 notifies the client computer 110 of the release of the jam via the NW I/F 207 and the NW I/F 238 of the information processing apparatus 109.

Then, the process proceeds to step S613, and the CPU 201 of the printing apparatus 101 receives the print job for the jammed and subsequent sheets from the information processing apparatus 109 and continues printing, and the process proceeds to step S614. Also when no jam occurs in step S606, the process proceeds to step S614.

In step S614, the CPU 216 of the inspection unit 106 determines whether or not a purge instruction in a case where the inspection result is bad has been received from the inspection apparatus 108. The process proceeds to step S615 if the purge instruction has been received, and the process proceeds to step S626 if the purge instruction has not been received. In step S626, the CPU 216 of the inspection unit 106 instructs the large volume stacker 107 via the accessory I/Fs 214 and 220 to discharge the sheet to the discharge destination designated in the print job, and the process proceeds to step S602.

On the other hand, in step S615, the CPU 216 of the inspection unit 106 instructs the large volume stacker 107 via the accessory I/Fs 214 and 220 to discharge the sheet whose inspection result is bad to the top tray 320.

Next, in step S616, the CPU 216 determines whether or not a print stop instruction has been received from the inspection apparatus 108 via the inspection apparatus I/F 215 and the inspection unit I/F 231. When the print stop instruction is not received here, the process proceeds to step S602. On the other hand, when the print stop instruction is received, the process proceeds to step S617, and the CPU 216 notifies the printing apparatus 101 and the large volume stacker 107 of the jam state via the accessory I/Fs 214, 208, and 220. This jam state includes position information of the jam found by a sensor (not illustrated) in the inspection unit 106 detecting the sheet. Next, the process proceeds to step S618, and the CPU 201 of the printing apparatus 101 applies a mechanism against occurrence of a jam in the printing apparatus 101 in a pseudo manner although the sheet has been discharged outside the printing apparatus 101. As described in step S607, the CPU 201 can detect which sheet is jammed, and this sheet information is also included in the jam state. Then, in step S618, the CPU 201 notifies the information processing apparatus 109 of the state of the jam via the NW I/Fs 207 and 238. This enables the information processing apparatus 109 to find which one of the sheets used in the print job has jammed, i.e., from where to perform recovery printing.

Then, the process proceeds to step S619, and the CPU 201 cancels the current print job. Next, the process proceeds to step S620, and the CPU 201 notifies the inspection unit 106 that printing has been stopped. Then, the process proceeds to step S621, and the CPU 201 instructs to discharge all the sheets in the apparatus to the top tray 320 of the large volume stacker 107. Then, in step S622, when all the sheets to be discharged have been discharged, the CPU 216 of the inspection unit 106 notifies the inspection apparatus 108 finish of sheet discharge via the inspection apparatus I/F 215 and the inspection unit I/F 231.

Next, in step S623, the CPU 216 waits until the information that the inspection is resumed, i.e., a recovery print instruction is obtained from the inspection apparatus 108 via the inspection apparatus I/F 215 and the inspection unit I/F 231. When the inspection is resumed, the process proceeds to step S624, and the CPU 216 notifies the printing apparatus 101 and the large volume stacker 107 of the release of the jam via the accessory I/Fs 214, 208, and 220. Then, the process proceeds to step S625, and the CPU 201 of the printing apparatus 101 receives, from the information processing apparatus 109, the job of recovery printing for printing the sheet whose inspection result is bad and subsequent sheets, then the process proceeds to step S602 again, and the processes of steps S602 to S625 are repeated until inspection of all the sheets has ended. When the inspection of all the sheets is finished in this manner, the printing is also completed, and thus this process is finished.

In the first exemplary embodiment, it has been described that the CPU 226 of the inspection apparatus 108 stops printing when a jam occurs. However, for example, the CPU 226 of the inspection apparatus 108 may notify the inspection unit 106 to discharge all the sheets already fed from the sheet feed decks 103 and 104 and present on the sheet conveyance path to the top tray 320, and the inspection unit 106 may instruct the printing apparatus 101 and the large volume stacker 107 via the accessory I/Fs 208, 214, and 220.

In the first exemplary embodiment, the sheet whose inspection result is bad is discharged to the top tray 320 of the large volume stacker 107. However, the sheet may be discharged to a discharge destination (tray) different from the discharge destination designated in the print job, for example, and the form is not limited to the top tray 320.

Figure 7:
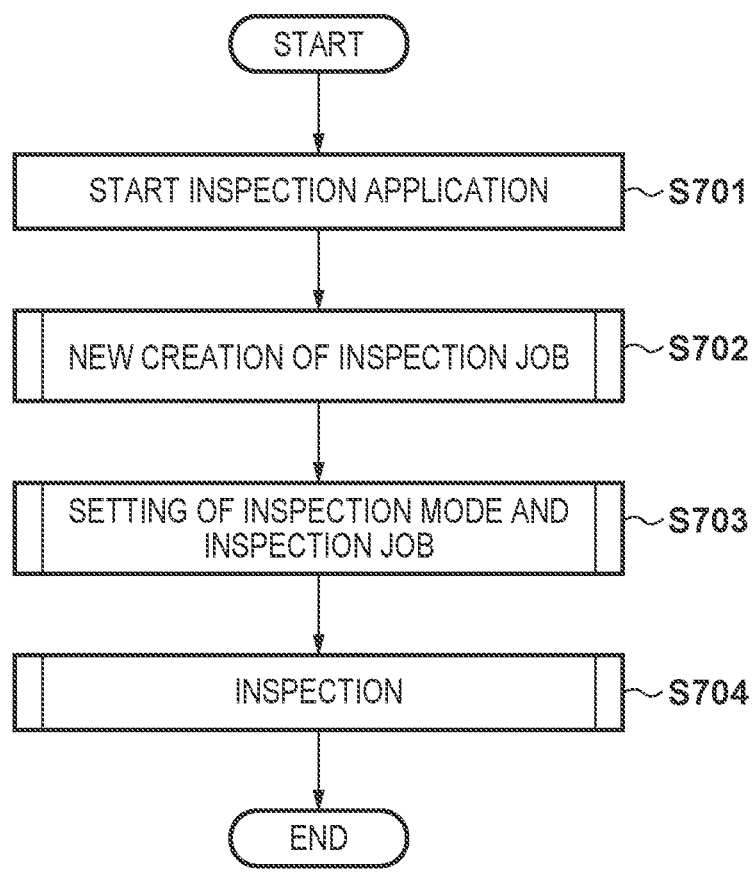
FIG. 7 is a flowchart for describing inspection processing in the inspection apparatus according to the first exemplary embodiment.

FIG. 7 is a flowchart for describing inspection processing in the inspection apparatus 108 according to the first exemplary embodiment. The processing described in the flowchart of FIG. 7 is achieved when the CPU 226 of the inspection apparatus 108 executes the program deployed in the RAM 227.

Figure 8:
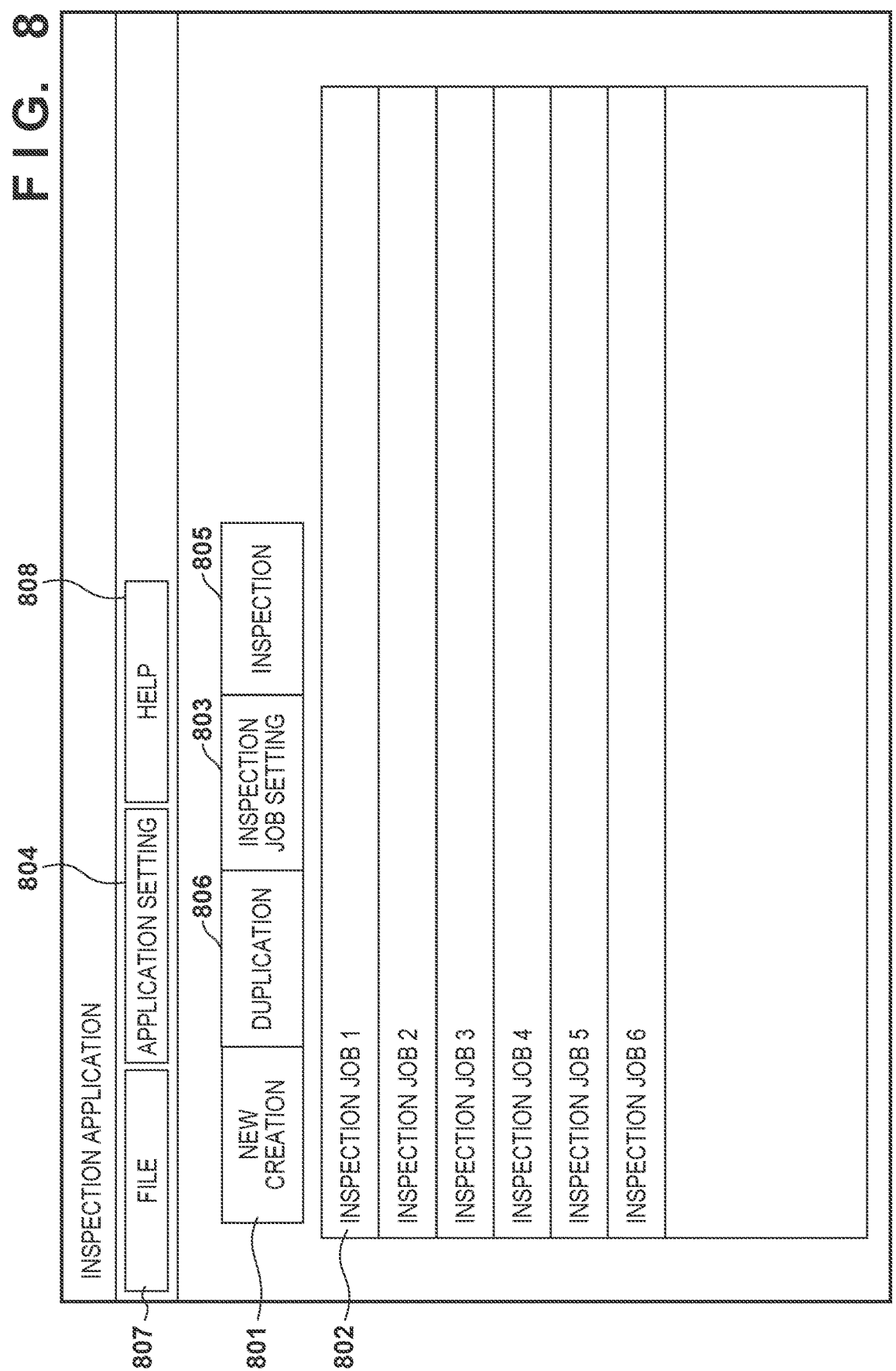
FIG. 8 depicts a view illustrating an example of a home screen of an inspection application displayed on the display unit of the inspection apparatus according to the first exemplary embodiment.

FIG. 8 depicts a view illustrating an example of a home screen of an inspection application displayed on the display unit 245 of the inspection apparatus 108 according to the first exemplary embodiment.

First, in step S701, when starting the inspection application deployed in the RAM 227, the CPU 226 displays a home screen of the inspection application illustrated in FIG. 8, for example, on the display unit 245. Next, the process proceeds to step S702, and the CPU 226 waits until a new creation button 801 is pressed on the screen of FIG. 8. When the new creation button 801 is pressed, the CPU 226 newly creates an inspection job, and saves the inspection job in the storage unit 228. Details of step S702 will be described later with reference to the flowchart of FIG. 9. Here, the inspection job has a data structure including an inspection job name, the number of sheets per one copy, the number of print copies, a sheet type, an area setting arrangement, and a reference image. Next, the process proceeds to step S703, and when detecting that an application setting button 804 is pressed on the screen of FIG. 8, the CPU 226 sets the inspection application stored in the storage unit 228 and overwrites the storage unit 228. Details of step S703 will be described later with reference to the flowchart of FIG. 17. Furthermore, when pressing on an inspection job setting button 803 is detected on the screen of FIG. 8, the inspection job selected in an inspection job list 802 is read from the storage unit 228. Then, the inspection job is set and overwritten in the storage unit 228. Then, the process proceeds to step S704, and when detecting the pressing on an inspection button 805 on the screen of FIG. 8, the CPU 226 executes the inspection job to execute the inspection, and writes the inspection result into the storage unit 228. Details of step S704 will be described later with reference to the flowchart of FIG. 15.

Figure 13:
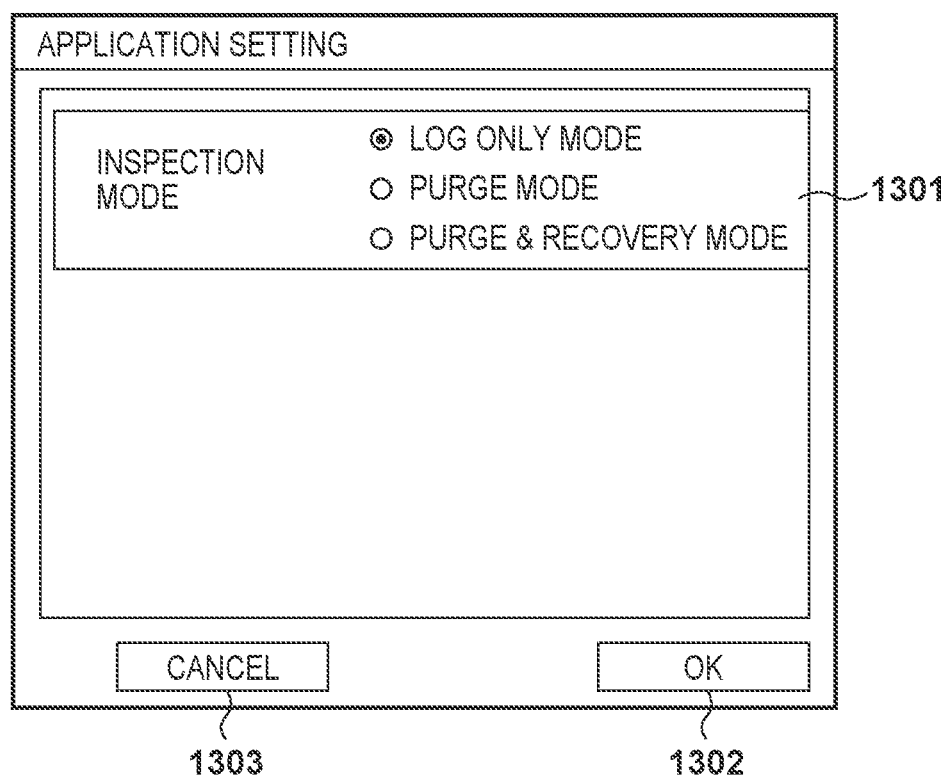
FIG. 13 depicts a view illustrating an example of a screen at the time of setting an inspection mode of an inspection application in the inspection apparatus according to the first exemplary embodiment.

Here, when the new creation button 801 on the screen of FIG. 8 is selected, a screen for newly creating an inspection job as illustrated in FIG. 10, for example, is displayed. The inspection job list 802 displays a list of inspection jobs stored in the storage unit 228, and the user selects a desired inspection job from the inspection jobs displayed in the inspection job list 802. The inspection job setting button 803 is for displaying a screen for setting the selected inspection job. The application setting button 804 is for displaying a screen for setting an inspection mode of the inspection application as illustrated in FIG. 13, for example. A duplication button 806 is a button for creating a duplication of the inspection job being selected. A file button 807 is used to output a report of the inspection result. A help button 808 is used to call a help of the inspection application.

Figure 9:
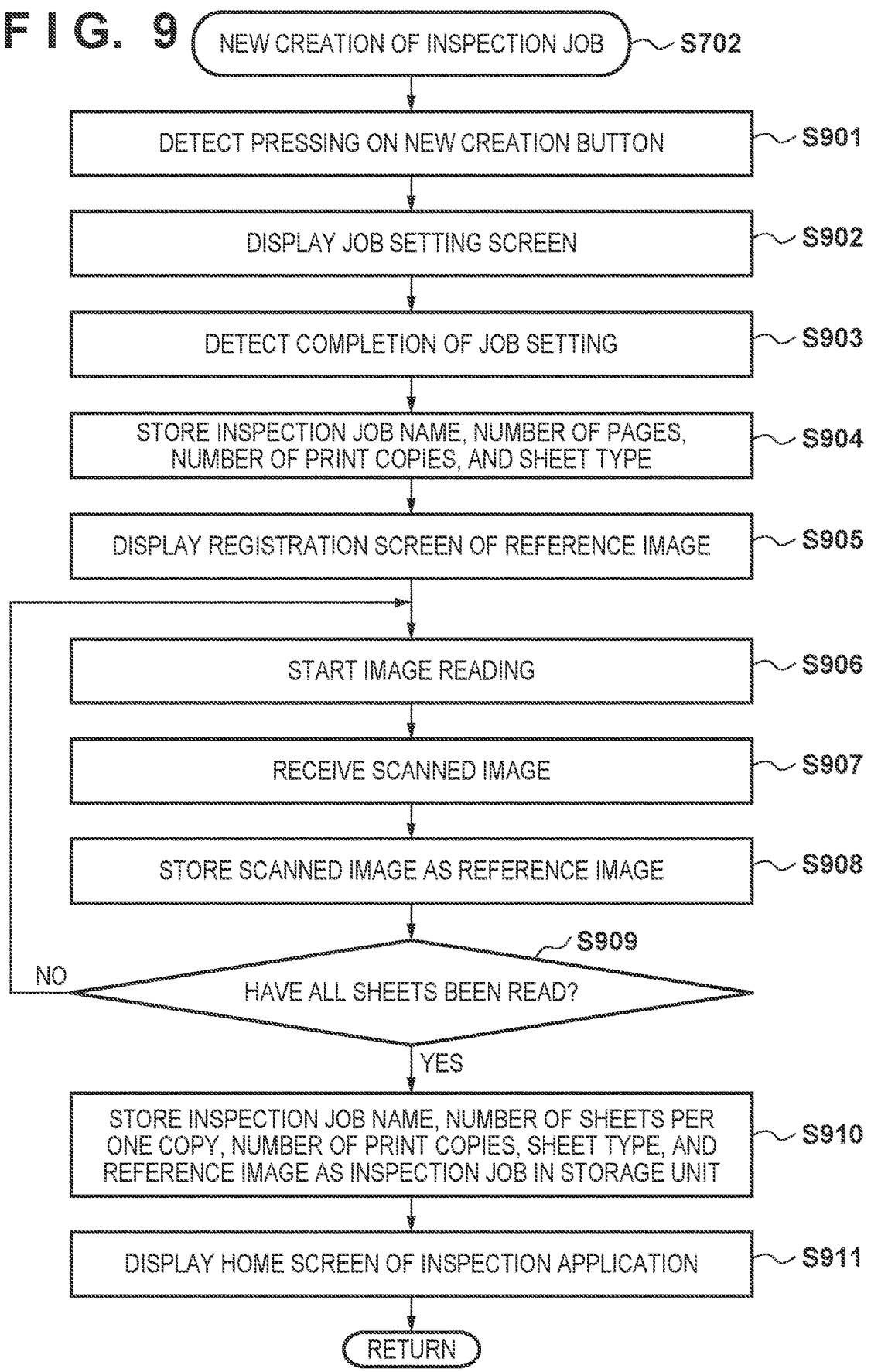
FIG. 9 is a flowchart for describing processing for newly creating an inspection job in step S702 of FIG. 7.

FIG. 9 is a flowchart for explaining processing for newly creating an inspection job in step S702 of FIG. 7.

Figure 11:
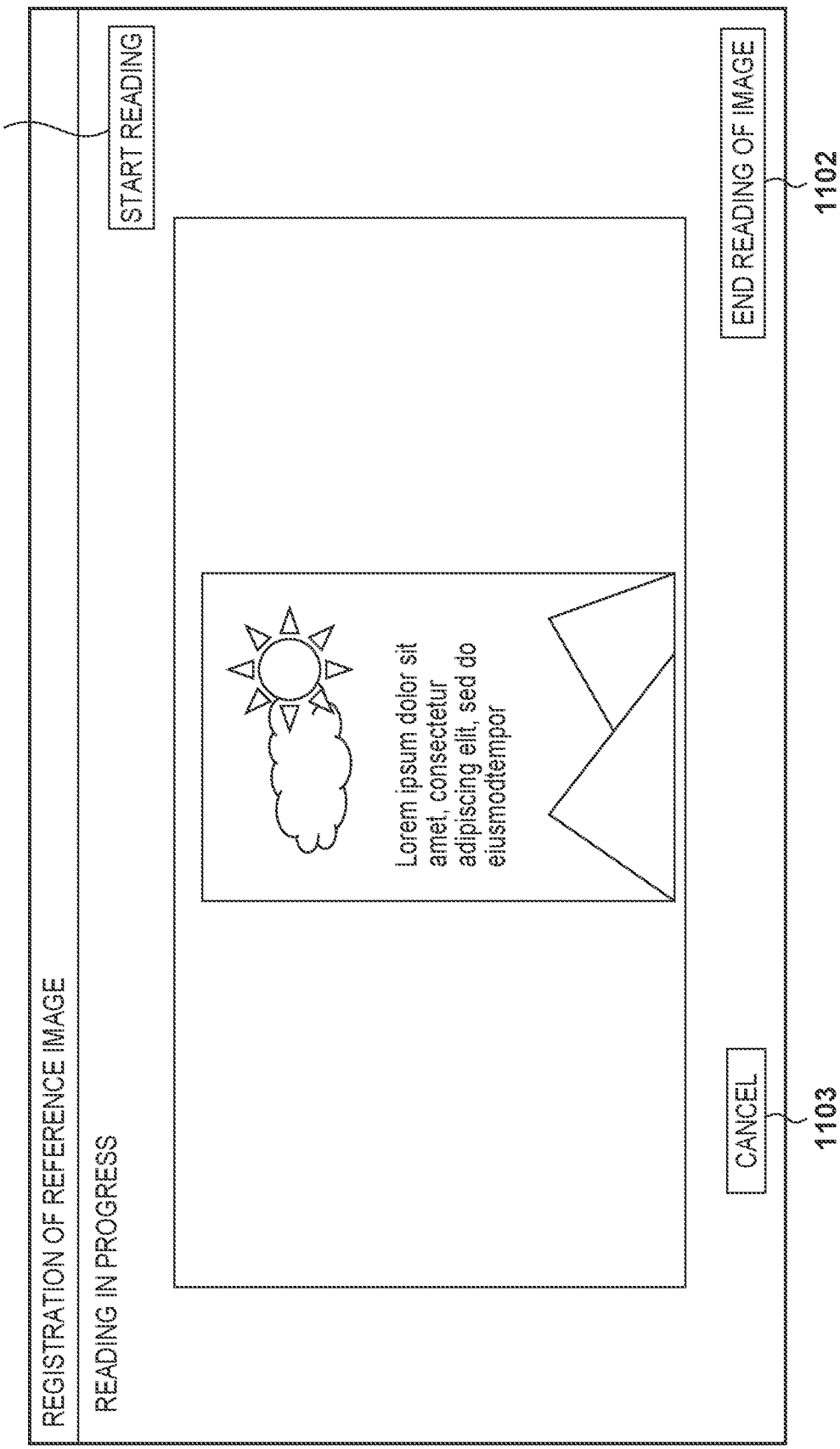
FIG. 11 depicts a view illustrating an example of a registration screen displayed on the display unit at the time of registration of a reference image in the inspection apparatus according to the first exemplary embodiment.

FIG. 10 depicts a view illustrating an example of a setting screen displayed on the display unit 245 when a new job is created, and FIG. 11 depicts a view illustrating an example of the registration screen displayed on the display unit 245 at the time of registration of a reference image.

When the CPU 226 detects pressing on the new creation button 801 on the screen of FIG. 8 in step S901, the process proceeds to step S902 and the CPU 226 displays the job setting screen illustrated in FIG. 10 on the display unit 245. The setting set on the screen of FIG. 10 is print setting for printing an image in order to register a reference image, and is also print setting used at the time of printing for inspection.

FIG. 10 depicts a view illustrating an example of a setting screen of a job of which an inspection job name 1002 is "new inspection job". Furthermore, in step S902, the CPU 226 secures a memory area for the inspection job in the RAM 227. In the example of FIG. 10, a number of sheets per one copy 1003 is 5, a number of print copies 1004 is 100, and a sheet size 1005 is A4. That is, the number of sheets per one copy 1003, the number of print copies 1004, and the sheet size 1005 are sheet information of the print job. In the first exemplary embodiment, since the inspection application does not receive the information on the print job from the printing apparatus 101, the information is manually input via the screen of FIG. 10. However, the inspection application may communicate with the printing apparatus 101 to automatically perform setting.

Next, the process proceeds to step S903, and when an OK button 1006 is pressed in a state where the inspection job name 1002, the number of sheets per one copy 1003, the number of print copies 1004, and the sheet size 1005 are input on the screen of FIG. 10, the CPU 226 detects the completion of the job setting and the process proceeds to step S904. A job ID 1001 is an identification number of an inspection job uniquely determined for each inspection job. On the other hand, when a cancel button 1007 is pressed, the CPU 226 discards the memory area for the inspection job secured in the RAM 227, displays the home screen of the inspection application of FIG. 8, and returns to the state before step S901. In step S904, the CPU 226 writes the information of the job ID, the inspection job name, the number of sheets per one copy, the number of print copies, and the sheet size that have been set on this screen into the memory area for the inspection job secured in the RAM 227. Then, the process proceeds to step S905, and the CPU 226 displays, on the display unit 245, the registration screen of the reference image illustrated in FIG. 11, for example.

FIG. 11 depicts a view illustrating an example of a registration screen for registering a reference image. Here, a read start button 1101 for instructing start of image scanning to register a reference image and an image read end button 1102 for instructing end of image scanning are displayed.

Next, the process proceeds to step S906, when the read start button 1101 on the screen of FIG. 11 is pressed and the CPU 226 receives an image read start instruction from the user, the process proceeds to step S907. In step S907, the CPU 226 receives, via the inspection unit I/F 231 and the inspection apparatus I/F 215, image data of the original document obtained by scanning with the CIS 315 and the CIS 316 of the inspection unit 106. Then, the process proceeds to step S908, and as a reference image, into the memory area for the inspection job secured in step S902, the CPU 226 saves the image data received in step S907. Or, when a cancel button 1103 is pressed on the screen of FIG. 11, the CPU 226 discards the memory area for the inspection job, displays the home screen of the inspection application of FIG. 8, and returns to the state before step S901.

Next, the process proceeds to step S909, and the CPU 226 repeats steps S906 to S908 until the image read end button 1102 is pressed on the screen of FIG. 11, i.e., the image reading of all the sheets is completed. When it is thus determined in step S909 that the image read end button 1102 has been pressed, the process proceeds to step S910. In step S910, the CPU 226 saves, as inspection jobs into the storage unit 228, the inspection job name, the number of sheets per one copy, the number of print copies, the sheet type, and the reference image that are saved in the memory area for the inspection job secured in step S902. Then, the process proceeds to step S911, and the CPU 226 switches the screen to the home screen of the inspection application of FIG. 8. At this time, the "new inspection job" created according to the flowchart of FIG. 9 is added and displayed in the inspection job list 802 of FIG. 8. The explanation of the new creation processing of the inspection job ends.

Note that the example presented here is one example, and the image read start instruction by the user with the display unit 245, for example, may be automatically performed in conjunction with a print start instruction in the printing apparatus 101, the information processing apparatus 109, or the client computer 110, and the mode thereof is not limited. The image read end instruction by the user with the display unit 245 may be automatically performed in conjunction with a print end on the printing apparatus 101, and the form thereof is not limited.

For example, the inspection apparatus 108 may read a plurality of images for the same page and register a composition result as a reference image.

FIG. 12 depicts a view illustrating an example of parameters used for setting an inspection job in the inspection apparatus 108 according to the first exemplary embodiment.

Figure 14:
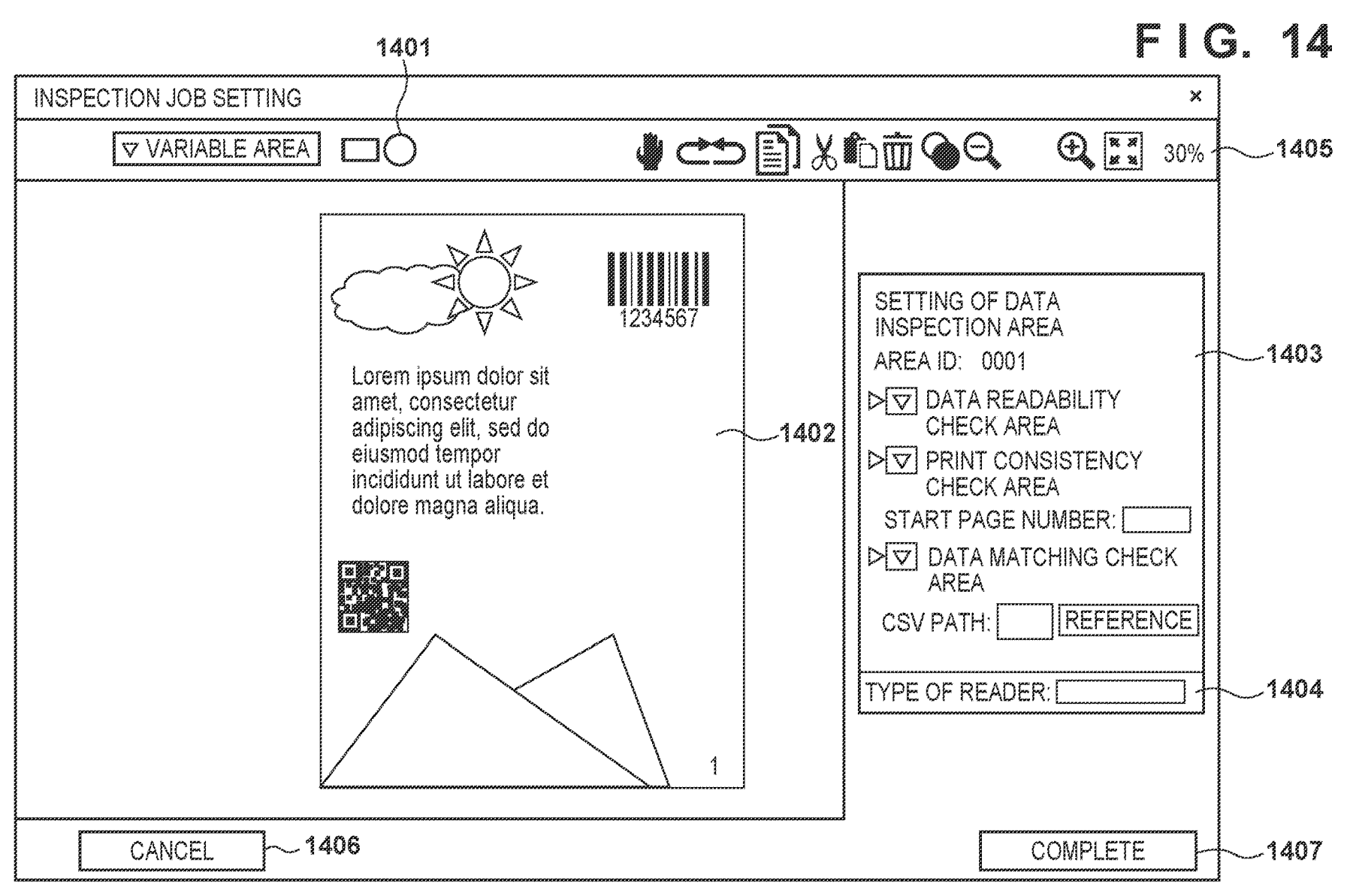

FIG. 13 depicts a view illustrating an example of a screen at the time of setting an inspection mode of an inspection application in the inspection apparatus 108 according to the first exemplary embodiment, and FIG. 14 depicts a view illustrating an example of a screen for setting an inspection area of an image and a reader when the inspection is performed in an inspection job. The inspection mode and the inspection job are set according to the flowchart of FIG. 17. In the first exemplary embodiment, an inspection job name

1202 to an area setting arrangement 1206, which are elements related to inspection, and an area ID 1207 to reference data 1211, which are included in an area setting 1213 that is an element of the area setting arrangement 1206, are referred to as inspection job settings. A combination of an inspection mode 1201 and an inspection job setting 1212, which are settings of the inspection application, is referred to as an inspection setting. The inspection settings are saved in the storage unit 228. In the first exemplary embodiment, the timing at which the inspection unit I/F 231 transmits a signal and the type of signal to be transmitted are different depending on the inspection mode 1201, and the operation of the printing apparatus 101 when bad occurs in the inspection result is determined accordingly.

In the first exemplary embodiment, as illustrated in FIG. 12, there are three types of inspection modes, a purge mode, a log only mode, and a purge & recovery mode. In the purge mode, when the inspection result is bad, the purge instruction in step S614 is transmitted to the inspection unit 106 via the inspection unit I/F 231, and the print stop instruction in step S616 is not transmitted. Therefore, although the inspection unit 106 instructs purging, recovery printing is not performed and printing is continued.

In the log only mode, when the inspection result is bad, the purge instruction in step S614 is not transmitted to the inspection unit 106 via the inspection unit I/F 231, and thus the inspection unit 106 does not instruct purging. However, in the log only mode, since the inspection result is left as a log, the inspection result can be checked by viewing the log.

In the purge & recovery mode, when the inspection result is bad, purging is instructed to the inspection unit 106 via the inspection unit I/F 231, and a print stop instruction is issued to perform purging and print stop. Then, after all the sheets in the machine are discharged to the top tray, a recovery print instruction is output to execute recovery printing. The inspection mode 1201 is set to the log only mode by default.

The inspection job setting 1212 includes the inspection job name 1202, the number of sheets per one copy 1203, the number of print copies 1204, and the sheet size 1205, which are values set on the screen for new creation of the inspection job illustrated in FIG. 10. The area setting arrangement 1206 is an empty arrangement by default.

The inspection mode 1201 is set on an application setting screen in FIG. 13.

FIG. 13 depicts a view illustrating an example of a screen for setting the inspection mode of the inspection application displayed on the inspection apparatus 108 according to the first exemplary embodiment.

When detecting pressing on an OK button 1302 on this screen, the CPU 226 sets the inspection mode by writing, into the storage unit 228, the inspection mode selected by a radio button of an inspection mode 1301. When a cancel button 1303 is pressed, the CPU 226 discards the memory area for inspection job settings secured in the RAM 227, and displays the home screen of the inspection application of FIG. 8.

The inspection job setting 1212 and the area setting 1213 in FIG. 12 are set on the screen in FIG. 14.

When an area selection icon 1401 is pressed on the screen of FIG. 14, a pull-down of inspection types from which a plurality of inspection types can be selected is displayed on the display unit 245. Here, when the inspection type is selected and a rectangular area is drawn on a reference image 1402, the CPU 226 creates an area ID corresponding to each area. Then, the CPU 226 adds the area setting of the created area ID to the area setting arrangement 1206 of FIG. 12, and stores, in the memory area for inspection job settings, the selected inspection type as the inspection job setting. Furthermore, as the inspection job setting, the CPU 226 stores upper left coordinates of the drawn coordinates and the area size into the memory area for inspection job settings.

In settings 1403 of data inspection area, when a value to be referred to is input in a blank in a case where the inspection type is a print consistency check or a data matching check, as the reference data, a start page number or a CSV path are stored into the inspection job setting memory as inspection job setting. When the path of a barcode reader or the path of a font file is input in the blank of a reader type 1404, the value is stored in the memory area for inspection job setting as the reader type.

When an edit icon 1405 is pressed, scaling of an image, copying of an area, and the like are performed at the time of setting the inspection area. When a cancel button 1406 is pressed, the setting on this screen is canceled, the memory area for inspection job settings secured in the RAM 227 is discarded, and the screen transitions to the home screen of the inspection application. When a completion button 1407 is pressed, the inspection job settings saved in the memory area for inspection job settings of the RAM 227 are copied to the storage unit 228.

The area setting 1213 of FIG. 12 is set with the inspection job setting screen in FIG. 14. When the setting screen of inspection job is opened, the CPU 226 secures the memory area for inspection job settings in the RAM 227, and copies the inspection job settings from the storage unit 228. In the inspection job setting screen of FIG. 14, when the area selection icon 1401 is pressed, the CPU 226 displays, on the display unit 245, a pull-down of a plurality of inspection types from which an inspection type can be selected. Here, when the inspection type is selected and a rectangular area is drawn on the reference image 1402, the CPU 226 creates an area ID corresponding to each area. Then, the CPU 226 adds the area setting of the created area ID to the area setting arrangement 1206, and stores, as the inspection job setting, the selected inspection type in the memory area for inspection job settings. Furthermore, as the inspection job setting, the CPU 226 stores upper left coordinates of the drawn coordinates and the area size into the memory area for inspection job settings.

Figure 15:
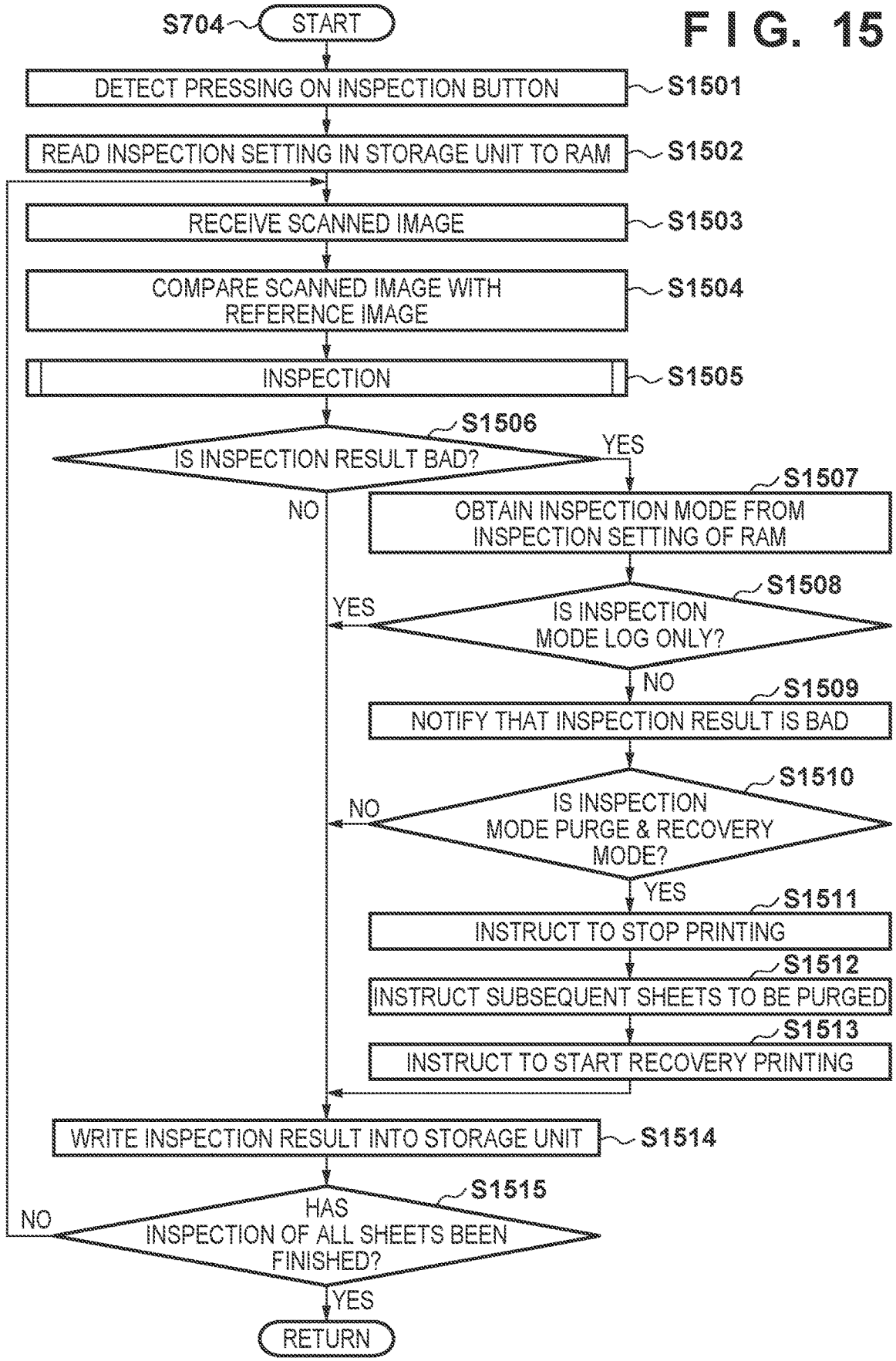
FIG. 15 is a flowchart for explaining processing (step S704) when the inspection apparatus according to the first exemplary embodiment performs inspection.

FIG. 15 is a flowchart for explaining the processing (step S704) when the inspection apparatus 108 according to the first exemplary embodiment performs inspection. Note that the processing described in this flowchart is achieved by the CPU 226 executing a program deployed in the RAM 227.

First, in step S1501, when the CPU 226 detects that the inspection button 805 is pressed on the screen of FIG. 8, the process transitions to step S1502. In step S1502, the CPU 226 reads, from the storage unit 228 into the RAM 227, the inspection settings of the inspection job selected in the inspection list 802 on the home screen of FIG. 8. Next, the process proceeds to step S1503, and the CPU 226 receives, via the inspection unit I/F 231 and the inspection apparatus I/F 215, the image data obtained by scanning the printed material (sheet) of the inspection target by the CIS 315 and the CIS 316 of the inspection unit 106. Then, the process proceeds to step S1504, and the CPU 226 reads the reference image of the corresponding page from the RAM 227. Then, the CPU 226 compares the reference image having been read with the scanned image data of the inspection target sheet received in step S1503.

In this comparison, first, image positions of the reference image and the scanned image data of the inspection target image are aligned using characteristic points of the image as reference points for position alignment. Next, in the scanned image data of the inspection target, the four corners of the sheet and the alignment reference points of the scanned image data are analyzed to detect whether or not there is a position misalignment of the image with respect to the sheet. Next, density values of the reference image and the scanned image data of the inspection target are compared for each pixel. As a result, when no defect is detected, the inspection result is OK.

Next, in step S1505, the CPU 226 performs inspection. Details of the processing in step S1505 will be described later with reference to the flowchart of FIG. 16. Next, the process proceeds to step S1506, and the CPU 226 determines whether or not the inspection result is bad. The process proceeds to step S1507 if the inspection result is bad, and the process proceeds to step S1514 if not bad. In step S1507, the CPU 226 obtains the inspection mode stored in the RAM 227, and the process proceeds to step S1508. In step S1508, the CPU 226 determines whether or not the obtained inspection mode is the log only mode, and if so, the process proceeds to step S1514. On the other hand, if the inspection mode is other than the log only mode, the process proceeds to step S1509.

In step S1509, the CPU 226 notifies the inspection unit 106 that the inspection result is bad via the inspection unit I/F 231 and the inspection apparatus I/F 215, and the process proceeds to step S1510. In step S1510, the CPU 226 determines whether or not the inspection mode obtained in step S1507 is the purge & recovery mode. The process proceeds to step S1511 if the inspection mode is the purge & recovery mode, and the process proceeds to step S1514 if the inspection mode is not the purge & recovery mode. In step S1511, the CPU 226 instructs the inspection unit 106 via the inspection unit I/F 231 and the inspection apparatus I/F 215 to stop printing. Subsequently, the process proceeds to step S1512, and the CPU 226 instructs the inspection unit 106 via the inspection unit I/F 231 and the inspection apparatus I/F 215 to discharge, to the top tray 320 of the large volume stacker 107, all the sheets already fed from the sheet feed decks 103 and 104 and present on the sheet conveyance path on and after the sheet whose inspection result is bad. When receiving from the inspection unit 106 that sheet discharge is finished, the process proceeds to step S1513, and the CPU 226 instructs the inspection unit 106 via the inspection unit I/F 231 and the inspection apparatus I/F 215 to start recovery printing, and the process proceeds to step S1514.

In step S1514, the CPU 226 writes, into the log held in the storage unit 228, the inspection result written in the RAM 227. Thereafter, the process proceeds to step S1515, and the CPU 226 determines whether or not the inspection of all sheets has been finished. The process proceeds to step S1503 if the CPU 226 determines that the inspection has not been finished, whilst this process is finished if the CPU 226 determines that the inspection of all sheets has been finished. Note that by receiving an instruction to end image reading from the user with an inspection end button (not illustrated) displayed on the display unit 245, the CPU 226 determines whether or not the inspection of all the sheets has been finished.

Figure 16:
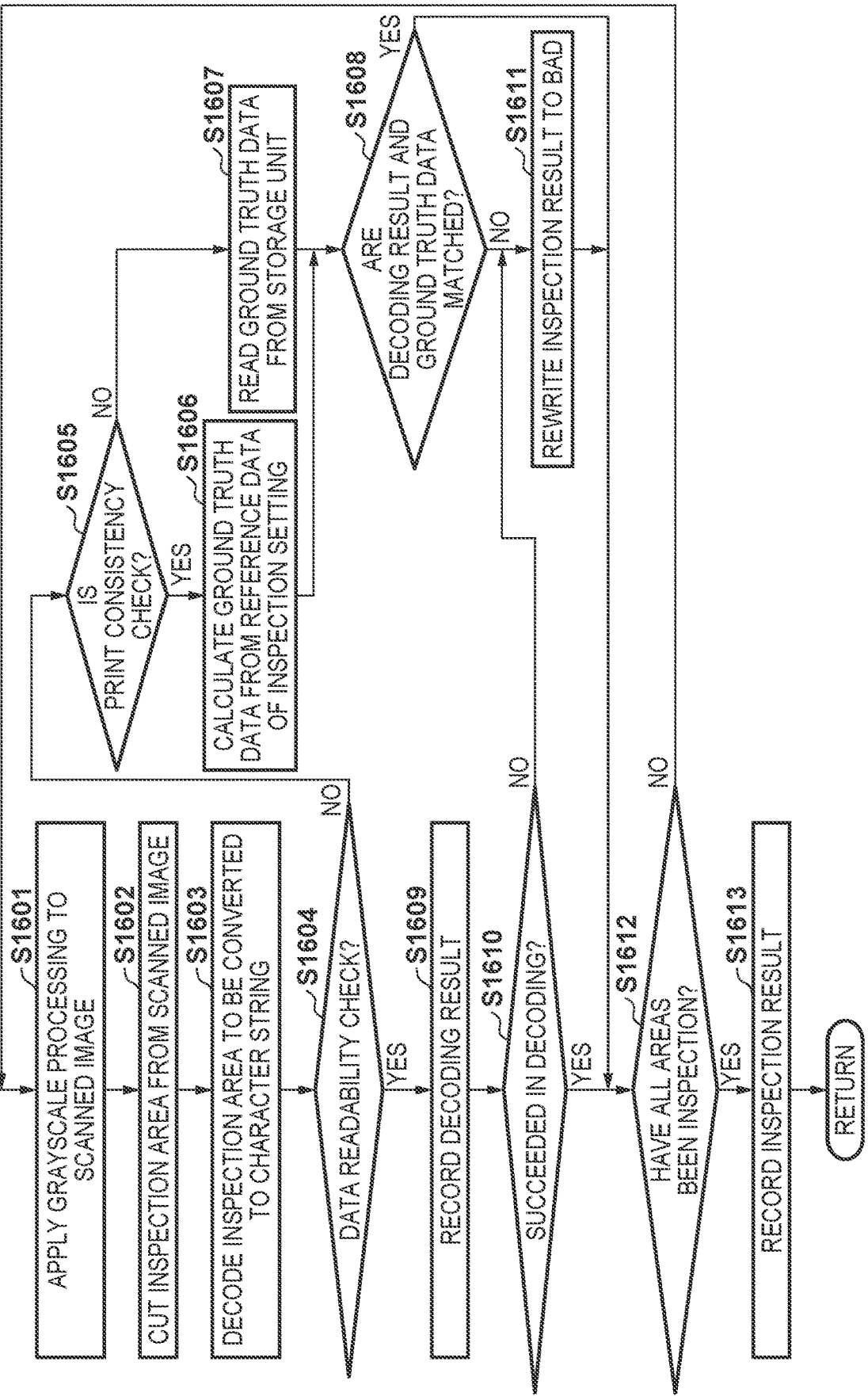
FIG. 16 is a flowchart for explaining inspection processing in step S1505 of FIG. 15.

FIG. 16 is a flowchart for explaining the inspection processing in step S1505 of FIG. 15.

In step S1601, the CPU 226 applies grayscale processing on the scanned image data used in the comparison in step S1504. Subsequently, the process proceeds to step S1602, and the CPU 226 obtains coordinate information 1208 in the inspection job settings saved in the RAM 227. Then, using this coordinate information 1208, the CPU 226 cuts out an inspection area of the scanned image data. Thereafter, the process proceeds to step S1603, and the CPU 226 obtains a reader type 1209 from the settings of the inspection job stored in the RAM 227 and calls the reader from the storage unit 228. Then, using this reader, the CPU 226 performs decoding on the cut out inspection area. Subsequently, the process proceeds to step S1604, and the CPU 226 obtains an inspection type 1210 from the setting of the inspection job of the RAM 227, and determines whether or not the inspection type is a data readability check to inspect whether or not to identify the data of the inspection area. Here, the process proceeds to step S1609 if the CPU 226 determines that it is the data readability check, and the process proceeds to step S1605 if the CPU 226 determines that it is not the data readability check.

In step S1605, the CPU 226 determines whether or not the inspection type is the print consistency check. At this time, the CPU 226 obtains reference data from the inspection job settings stored in the RAM 227. The process proceeds to step S1606 if the CPU 226 determines in step S1605 that the inspection type is the print consistency check, and the process proceeds to step S1607 if the CPU 226 determines that the inspection type is not the print consistency check, i.e., the inspection type is the data matching check. In step S1606, the CPU 226 adds the obtained reference data and the current number of print copies to obtain ground truth data, and the process proceeds to step S1608. On the other hand, in step S1607, the CPU 226 reads the ground truth data from the storage unit 228 using the obtained reference data, and the process proceeds to step S1608. In step S1608, the CPU 226 compares the ground truth data obtained in step S1606 or step S1607 with the decoding result obtained in step S1603. As a result of this comparison, the process proceeds to step S1612 if they match, and the process proceeds to step S1611 if they do not match.

The process proceeds to step S1609 if the CPU 226 determines in step S1604 that the inspection type is the data readability check, and the CPU 226 writes the decoding result into the RAM 227. Then, the process proceeds to step S1610, and the CPU 226 determines whether the decoding in step S1603 is successful with no error occurring. Here, the process proceeds to step S1612 if the CPU 226 determines that the decoding has succeeded, and the process proceeds to step S1611 if the CPU 226 determines that the decoding has failed. In step S1611, the CPU 226 rewrites the inspection result of the RAM 227 to bad, and the process proceeds to step S1612. In step S1612, the CPU 226 determines whether the inspection of all the elements included in the area setting arrangement 1206 of the inspection job setting read into the RAM 227 has been finished. The process proceeds to step S1613 if the CPU 226 determines that the inspection of all the elements has been finished, and the process returns to step S1603 if the CPU 226 determines that the inspection of all the elements has not been finished. Then, in step S1613, the CPU 226 records the inspection result into the RAM 227, and finishes this process.

Note that the example presented here is one example, and the image read start instruction by the user with the display unit 245, for example, may be automatically performed in conjunction with a print start instruction in the printing apparatus 101, the information processing apparatus 109, or the client computer 110, and the mode thereof is not limited. The image read end instruction by the user with the display unit 245 may be automatically performed in conjunction with a print end on the printing apparatus 101, and the form thereof is not limited.

Figure 17:
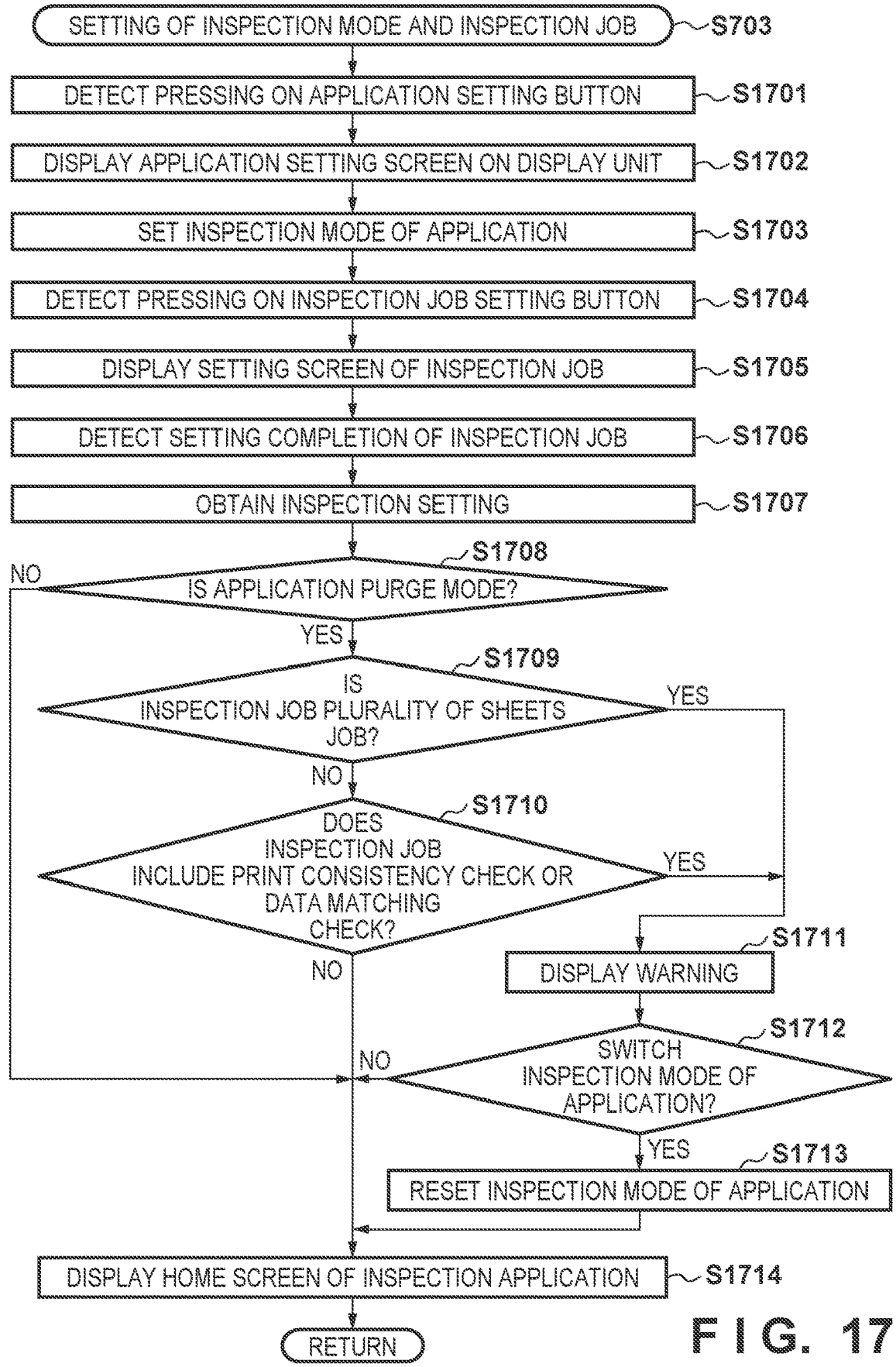
FIG. 17 is a flowchart for explaining setting processing of an inspection mode and an inspection job in step S703 of FIG. 7 by the inspection apparatus according to the first exemplary embodiment.

FIG. 17 is a flowchart for explaining setting processing of the inspection mode and the inspection job in step S703 of FIG. 7 by the inspection apparatus 108 according to the first exemplary embodiment. Note that the processing described in this flowchart is achieved by the CPU 226 executing a program deployed in the RAM 227. This flowchart describes the processing of setting each parameter illustrated in FIG. 12.

When the CPU 226 detects in step S1701 that the application setting button 804 on the screen of FIG. 8 displayed on the display unit 245 is pressed, the process proceeds to step S1702. In step S1702, the CPU 226 displays the application setting screen illustrated in FIG. 12 on the display unit 245. Then, the CPU 226 secures a memory area for the inspection mode in the RAM 227. Then, the process proceeds to step S1703, and the CPU 226 detects that the user has selected a radio button of the inspection mode 1301 on the screen of FIG. 13 and has pressed the OK button 1302. By this, the CPU 226 saves the mode selected on the screen (FIG. 13) into the memory area for the inspection mode of the RAM 227 as a parameter of the inspection mode 1201. Thereafter, the CPU 226 copies the selected mode from the memory area of the inspection mode of the RAM 227 to the memory area storing the inspection mode of the storage unit 228, and releases the memory area of the inspection mode of the RAM 227. Then, the CPU 226 closes the application setting screen in FIG. 13, and the process transitions to step S1704.

When detecting the pressing on the inspection job setting button 803 on the screen of FIG. 8 in step S1704, the CPU 226 secures a memory area for inspection settings in the RAM 227. In the memory area for inspection job settings, the CPU 226 copies and saves the inspection job settings from the storage unit 228. Thereafter, the process proceeds to step S1705, and the CPU 226 displays the inspection job setting screen illustrated in FIG. 14 on the display unit 245, for example. Then, the process proceeds to step S1706, and the CPU 226 receives the inspection job setting of the user via the display unit 245. Then, when detecting that the area selection icon 1401 is pressed on the inspection job setting screen of FIG. 14, the CPU 226 displays, on the display unit 245, a pull-down of the inspection type from which a plurality of inspection types can be selected. Here, when the inspection type is selected from the pull-down, a rectangular area is drawn on the reference image 1402. Then, the CPU 226 creates the area ID and stores the area ID into the area ID 1207. Then, the CPU 226 adds the created area ID to the area setting arrangement 1206, and stores the selected inspection type into the inspection type 1210 of the memory area for inspection job setting. Furthermore, the CPU 226 stores, into the coordinate information 1208, the upper left coordinates of the drawn coordinates and the area size. When the user inputs the settings 1403 of data inspection, the CPU 226 saves the reader type 1209 and the reference data 1211 into the RAM 227 accordingly. Then, the process proceeds to step S1707, and the CPU 226 first obtains the values of the inspection settings stored in the RAM 227 in order to save those inspection settings into the storage unit 228.

Next, the process proceeds to step S1708, and the CPU 226 checks the inspection mode 1201 and determines whether or not it is the purge mode. The process proceeds to step S1709 if the CPU 226 determines that it is the purge mode, and the process proceeds to step S1714 if the CPU 226 determines that it is not the purge mode. In step S1709, the CPU 226 determines whether or not the inspection job stored in the RAM 227 is a print job in which one copy includes a plurality of sheets. The process proceeds to step S1710 if the CPU 226 determines that it is a print job of one sheet, and the process proceeds to step S1711 if the CPU 226 determines that it is a print job of a plurality of sheets. In step S1710, the CPU 226 checks the inspection type 1210 stored in the RAM 227, and determines whether or not the inspection job includes the print consistency check or the data matching check. Here, the inspection type including the print consistency check or the data matching check is a print job corresponding to the variable print job. Therefore, the print job including these inspection types needs to be exclusively controlled from the purge mode. Therefore, the process proceeds to step S1714 if the CPU 226 determines in step S1710 that the inspection job does not include both of the inspections, and displays the home screen. However, the process proceeds to step S1711 if the CPU 226 determines that either of or both of the print consistency check and the data matching check are included, and the CPU 226 displays a warning 1801 illustrated in FIG. 18, for example, on the display unit 245 and the process proceeds to step S1712.

Figure 18:
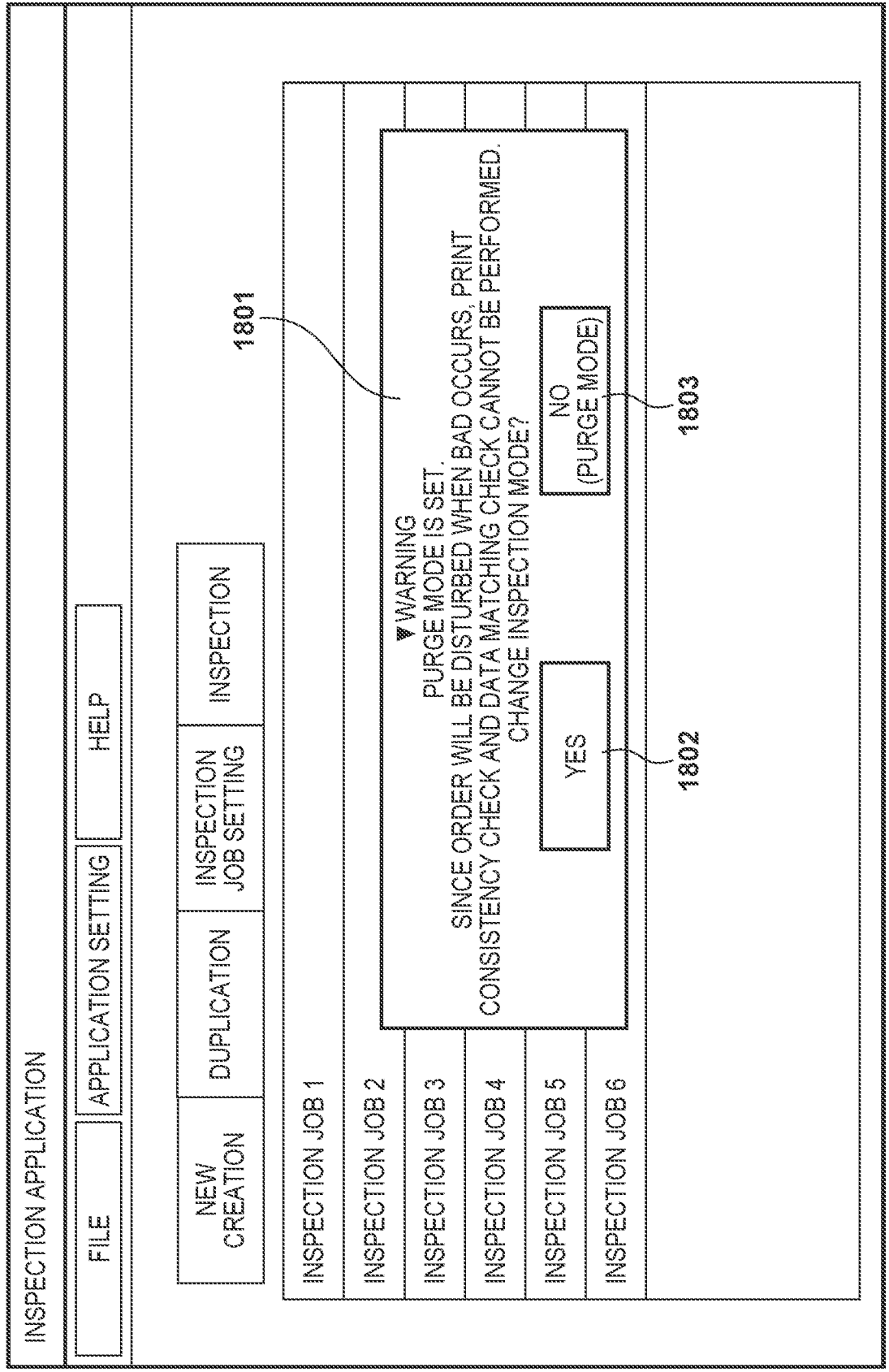
FIG. 18 depicts a view illustrating an example of a screen displayed on the display unit of the inspection apparatus in step S1711 of FIG. 17.

FIG. 18 depicts a view illustrating an example of the screen displayed on the display unit 245 of the inspection apparatus 108 in step S1711 of FIG. 17.

Then, in step S1712, the CPU 226 receives an input from the user. Here, when a No (purge mode) button 1803 is pressed, the process transitions to step S1714. When a Yes button 1802 is pressed, the process transitions to step S1713. Here, the No (purge mode) button 1803 is used in partial data matching check. The data matching check is variable, but in the case of printing to be put in an envelope with a window, for example, it is sufficient to perform reprinting later even if a missing occurs in the printed product. In step S1713, the CPU 226 displays, on the display unit 245, the application setting screen illustrated in FIG. 13, for example. Here, the CPU 226 waits for the user to set the inspection mode again and press the OK button 1302. When the application inspection mode is determined via the OK button 1302, the CPU 226 rewrites again the storage unit 228 to the application setting selected here, and the process proceeds to step S1714. In step S1714, the CPU 226 copies, to the storage unit 228, all the inspection settings having been set so far and written in the RAM 227, and releases the memory area for inspection settings of the RAM 227. Thereafter, the CPU 226 displays the home screen of the inspection application of FIG. 8 on the display unit 245.

Thus, in the first exemplary embodiment, the available inspection type is limited in the purge mode where the order of the printed products cannot be guaranteed. Specifically, the purge mode, and the inspection of the variable print job or the print job in which one copy includes a plurality of sheets are not set simultaneously, and therefore the order of printed products can be guaranteed.

As described above, according to the first exemplary embodiment, it is possible to exclusively control the purge mode and, for example, the print consistency check or the data matching check, which are inspections likely to fail to secure the order when bad occurs in the inspection result. By this, even when bad occurs in the inspection result, the sheet is not purged, and thus it is possible to prevent missing in the printed product from occurring.

Second Exemplary Embodiment

In the first exemplary embodiment described above, an example has been described in which after the inspection type of the inspection mode of the inspection application is determined, the user reselects the inspection mode. In the second exemplary embodiment, an example of controlling selection of an inspection type for an inspection application will be described with reference to FIG. 19. Note that the system, the hardware configuration of each apparatus, and the like according to the second exemplary embodiment are the same as those of the first exemplary embodiment described above, and thus the description thereof will be omitted.

Figure 19:
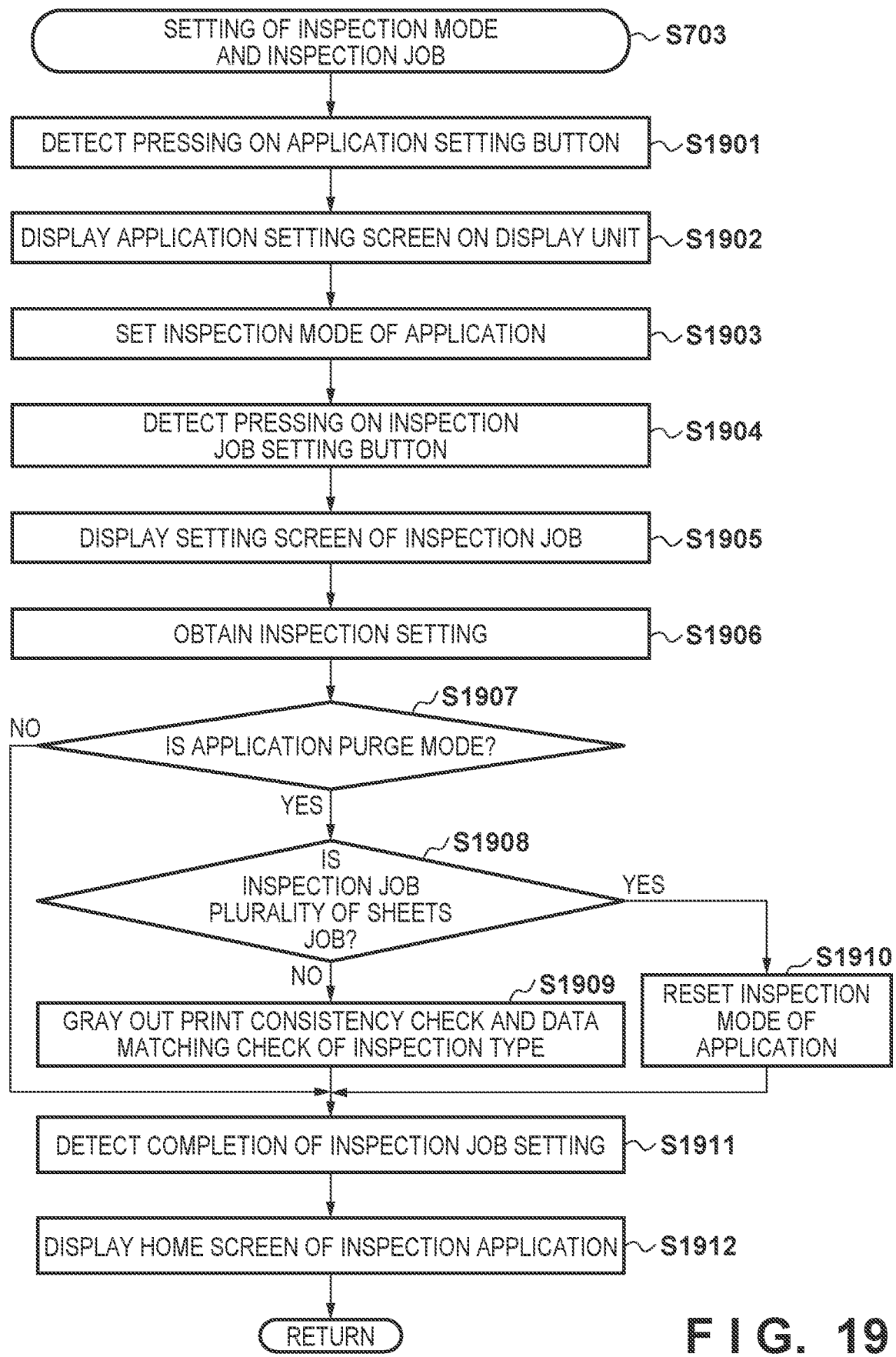
FIG. 19 is a flowchart for explaining setting processing of an inspection mode and an inspection job by an inspection apparatus according to a second exemplary embodiment.

FIG. 19 is a flowchart for explaining setting processing of an inspection mode and an inspection job by the inspection apparatus 108 according to the second exemplary embodiment. Note that the processing described in this flowchart is achieved by the CPU 226 executing a program deployed in the RAM 227. This processing corresponds to FIG. 17 of the first exemplary embodiment described above, and this flowchart describes the processing of setting each parameter illustrated in FIG. 12. In FIG. 19, steps S1901 to S1906 are similar to steps S1701 to S1705 and S1707 in FIG. 17 described above.

Figure 20:
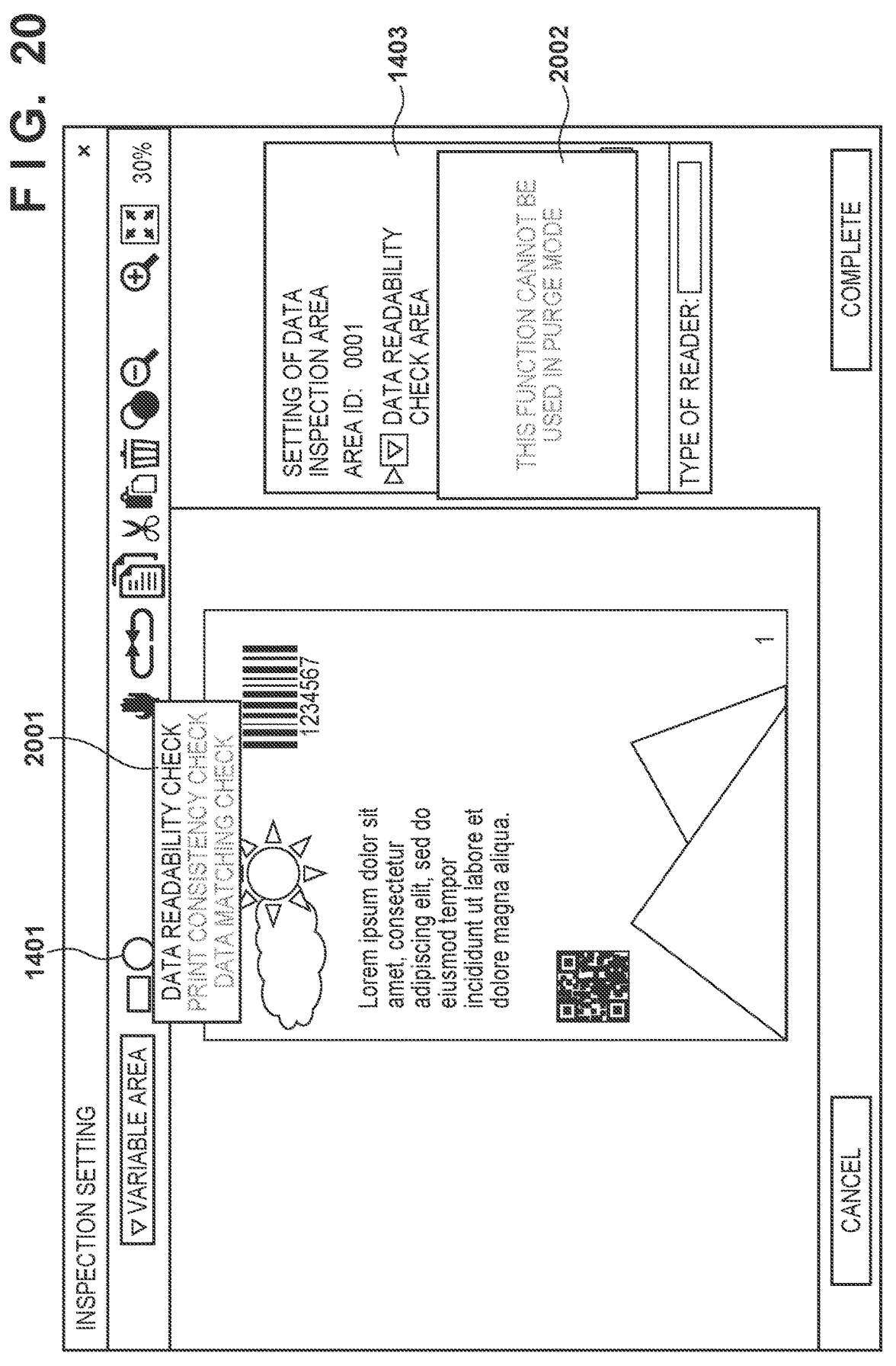

In step S1907, the CPU 226 checks the inspection mode 1201 stored in the RAM 227 and determines whether or not it is the purge mode. The process proceeds to step S1911 if the CPU 226 determines that it is not the purge mode, and the process proceeds to step S1908 if the CPU 226 determines that it is the purge mode. In step S1908, the CPU 226 determines whether or not the inspection job is a print job in which one copy includes a plurality of sheets based on the number 1203 of sheets per copy of the inspection setting stored in the RAM 227. Here, the process proceeds to step S1910 if the CPU 226 determines that it is a print job in which one copy includes a plurality of sheets, and the process proceeds to step S1909 if it is a print job in which one copy includes one sheet. In step S1909, as illustrated in FIG. 20, the CPU 226 grays out and displays the parts of the print consistency check and the data matching check in a pull-down 2001 and setting 2002 of the data inspection area, and the process proceeds to step S1911. On the other hand, in step S1910, the CPU 226 resets the inspection mode of the application similarly to step S1713, and the process proceeds to step S1911.

According to this processing, in the case of the purge mode and in the case where the number of sheets per one copy is one, it is possible to perform only the data readability check, and it is possible to prevent the inspection type in which the order of the printed product is important, e.g., the print consistency check and the data matching check from being designated. In the case of the purge mode and in the case where the number of sheets per one copy is more than one, it is possible to prompt the user to reset the inspection mode.

FIG. 20 depicts a view illustrating an example of a screen for setting an inspection job displayed on the display unit 245 in step S1909 of FIG. 19.

FIG. 20 illustrates the pull-down 2001 of the inspection type from which a plurality of inspection types can be selected by pressing the area selection icon 1401. Then, in this pull-down 2001, only the data readability check can be set, and the print consistency check and the data matching check are grayed out and cannot be set. Also in the settings 1403 of data inspection area, the settings of the print consistency check and the data matching check are grayed out and cannot be set.

Thereafter, the process proceeds to step S1911, and the CPU 226 receives the inspection job setting by the user via the display unit 245 similarly to step S1706. However, here, the print consistency check and the data matching check grayed out in step S1909 remain grayed out and cannot be selected. Then, the process proceeds to step S1912, and the CPU 226 displays the home screen of the inspection application on the display unit 245 similarly to step S1714, and finishes this process.

As described above, according to the second exemplary embodiment, it is possible to change the order of the inspection type and the application setting. There are various exclusive control methods. As in the first exemplary embodiment, an inspection mode that can be used according to the inspection type may be selected later. As in the second exemplary embodiment, an inspection type that cannot be used for a set inspection mode can be grayed out so that it cannot be set.

Third Exemplary Embodiment

In the first and second exemplary embodiments described above, a mode in which the setting of the inspection application includes inspection modes such as the purge mode and the log only mode, and control is performed according to the inspection mode has been described. On the other hand, if the inspection application includes the inspection mode, when the inspection mode is switched, the mode is also switched for other jobs. In the third exemplary embodiment, an example in which the inspection job includes settings of inspection mode is described with reference to the flowchart of FIG. 21. Note that the system, the hardware configuration of each apparatus, and the like according to the third exemplary embodiment are the same as those of the first exemplary embodiment described above, and thus the description thereof will be omitted.

Figure 21:
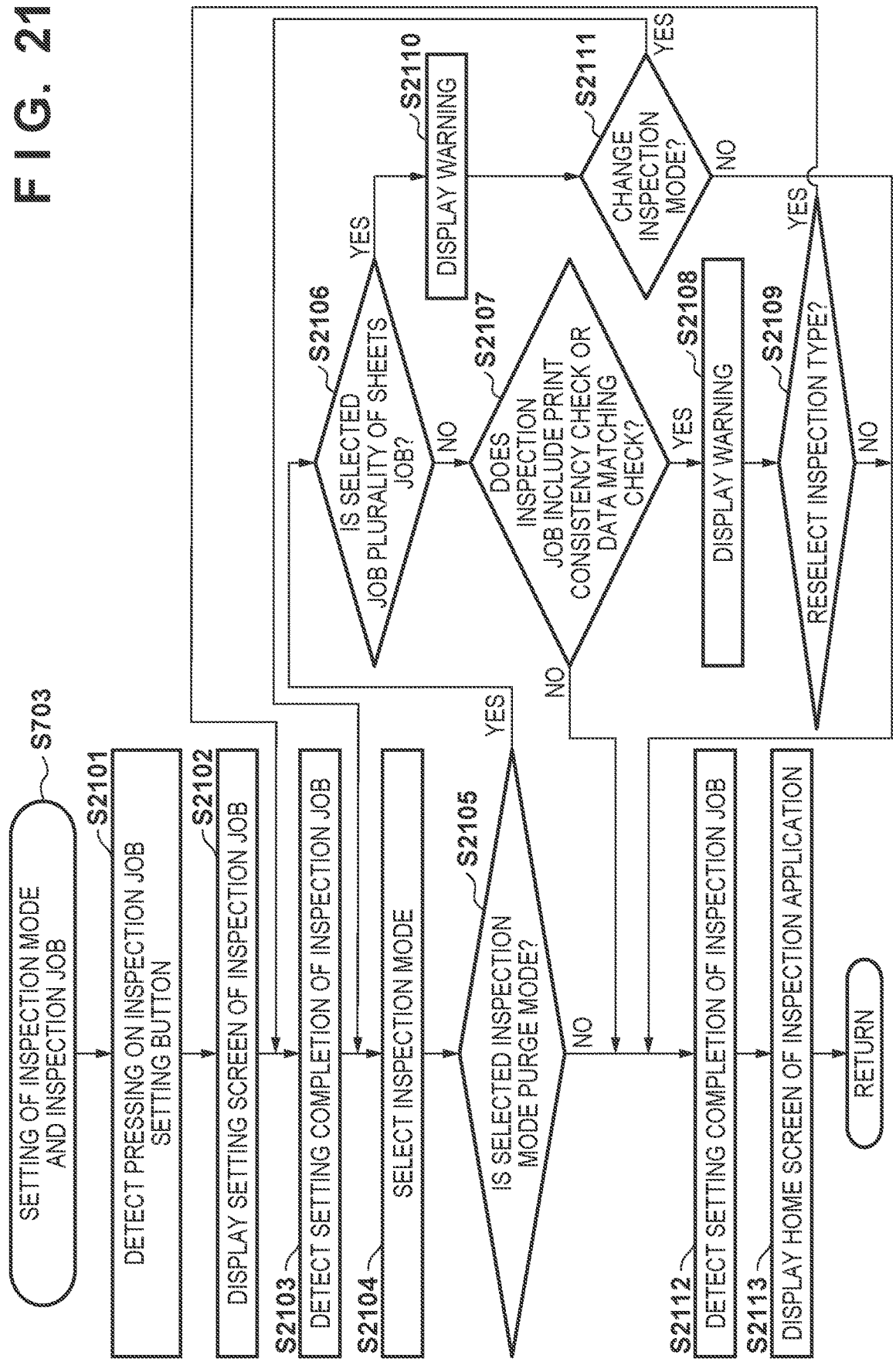
FIG. 21 is a flowchart for explaining setting processing of an inspection mode and an inspection job by an inspection apparatus according to a third exemplary embodiment.

FIG. 21 is a flowchart for explaining setting processing of an inspection mode and an inspection job by the inspection apparatus 108 according to the third exemplary embodiment. Note that the processing described in this flowchart is achieved by the CPU 226 executing a program deployed in the RAM 227. This processing corresponds to FIG. 17 of the first exemplary embodiment described above, and this flowchart describes the processing of setting each parameter illustrated in FIG. 12. In FIG. 21, step S2101, step S2102, and step S2103 are the same as step S1704, step S1705, and step S1706 in FIG. 17 described above. However, the inspection mode 1201 in FIG. 12 is included in not the settings of application but the settings of inspection job in the third exemplary embodiment.

Figure 22:
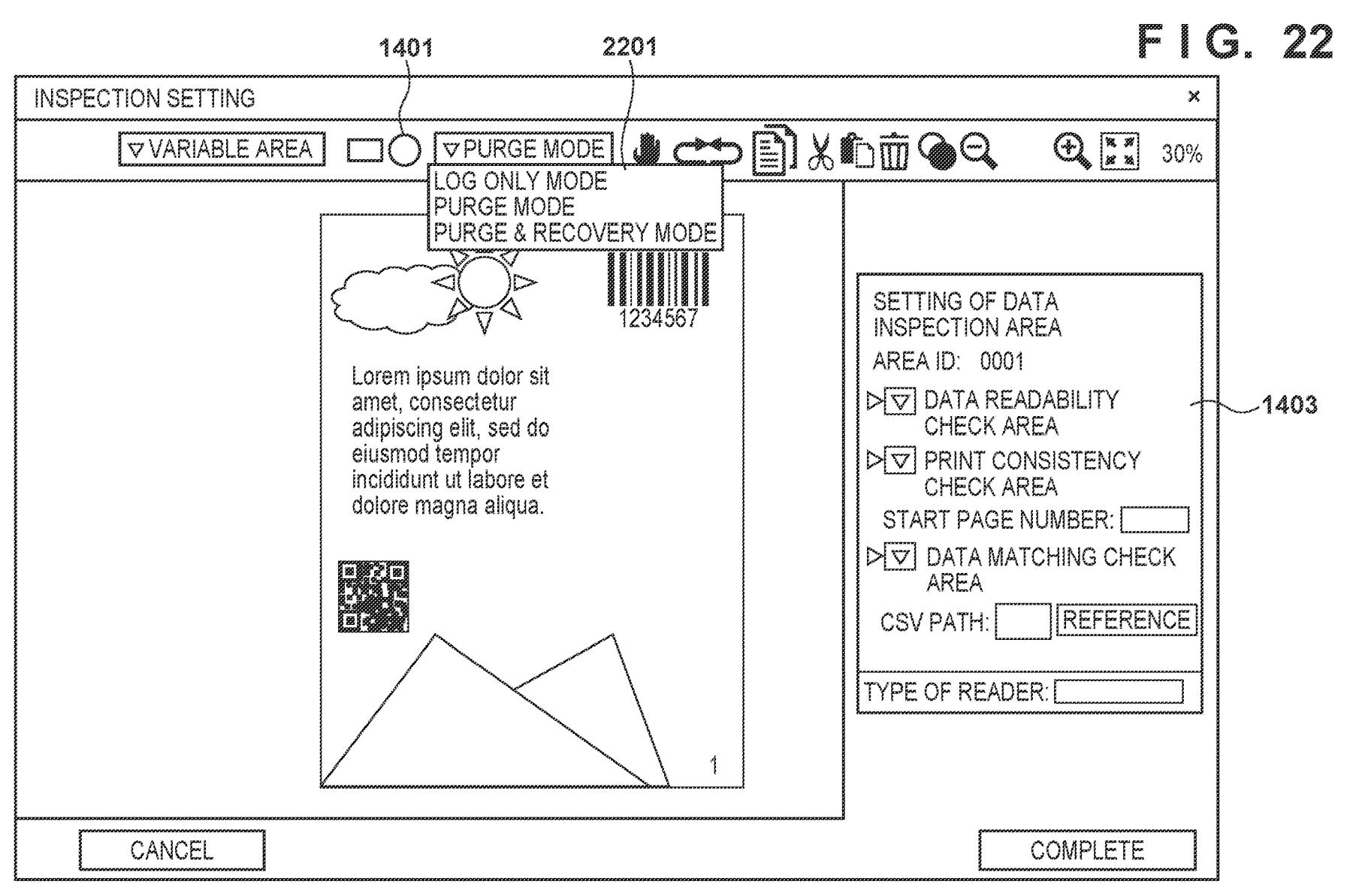

When the CPU 226 inputs the setting completion of the inspection job for all the areas in step S2103, the process proceeds to step S2104, and the CPU 226 receives the user's inspection mode selection via a pull-down 2201 in FIG. 22.

FIG. 22 depicts a view illustrating an example of a screen for setting the inspection job displayed on the display unit 245 of the inspection apparatus 108 in step S2104 of FIG. 21.

FIG. 22 illustrates the pull-down 2201 of the inspection mode from which a plurality of inspection modes can be selected by pressing the area selection icon 1401.

In step S2105, the CPU 226 determines whether or not the inspection mode selected on the screen (FIG. 14) by the user is the purge mode. The process proceeds to step S2106 if it is the purge mode, and the process proceeds to step S2112 if otherwise. In step S2106, the CPU 226 obtains the inspection job setting 1212 stored in the RAM 227, and determines whether or not the selected job is a print job in which one copy includes a plurality of sheets. If it is a print job in which one copy includes a plurality of sheets, the process proceeds to step S2110 to display a warning, and the process proceeds to step S2111. If it is not a print job in which one copy includes a plurality of sheets, the process proceeds to step S2107. In step S2107, the CPU 226 determines whether or not the inspection job setting 1212 stored in the RAM 227 includes an inspection type of the print consistency check or the data matching check of which the order is important. When the CPU 226 determines that the print consistency check or the data matching check is included, the process proceeds to step S2108, and the CPU 226 displays a warning on the display unit 245 and the process proceeds to step S2109. When the CPU 226 determines in step S2109 that the user reselects the inspection type, the process proceeds to step S2103. If the user does not reselect the inspection type, the process proceeds to step S2112. In step S2111, the CPU 226 determines whether or not the user reselects the inspection mode. The process returns to step S2104 if the user reselects the inspection mode, and the process proceeds to step S2112 if the user does not reselect the inspection mode. Step S2112 and step S2113 are similar to step S1706 and step S1714 in FIG. 17, respectively, and therefore the description thereof is omitted.

As described above, according to the third exemplary embodiment, there is an effect that the inspection mode can be included in the settings of the inspection job, and the switching of the inspection mode can be performed independently in each job.

Fourth Exemplary Embodiment

In the third exemplary embodiment described above, the inspection mode is associated with the inspection job, and the inspection job is determined after the inspection mode is determined. On the other hand, in the fourth exemplary embodiment, an example in which selection of the inspection mode is controlled according to the inspection type will be described with reference to the flowchart of FIG. 23. Note that the system, the hardware configuration of each apparatus, and the like according to the fourth exemplary embodiment are the same as those of the first exemplary embodiment described above, and thus the description thereof will be omitted.

Figure 23:
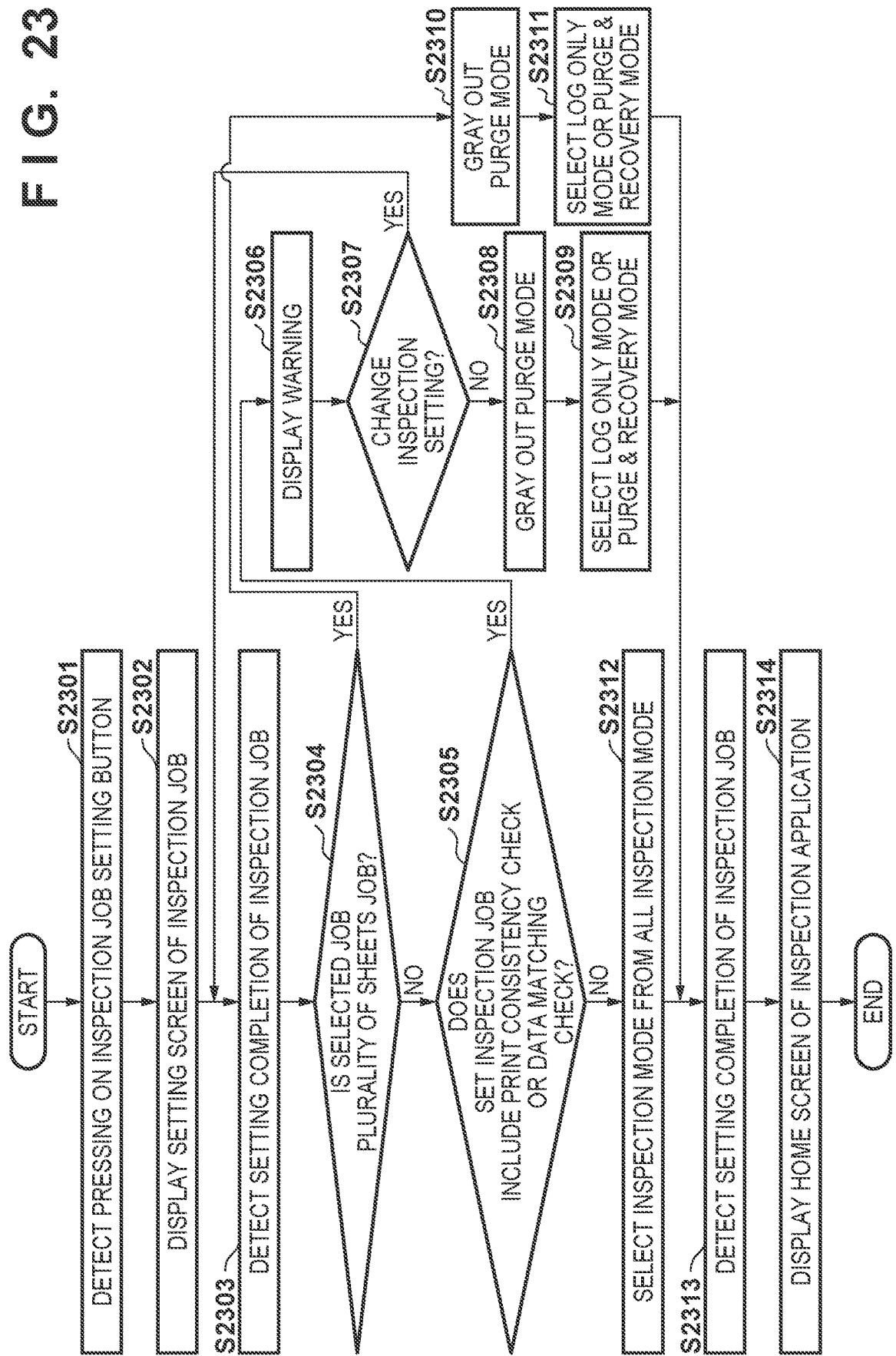
FIG. 23 is a flowchart for explaining setting processing of an inspection mode and an inspection job by an inspection apparatus according to a fourth exemplary embodiment.

FIG. 23 is a flowchart for explaining setting processing of an inspection mode and an inspection job by the inspection apparatus 108 according to the fourth exemplary embodiment. Steps S2301, S2302, and S2303 in FIG. 23 are similar to steps S1704, S1705, and S1706 in FIG. 17. However, the inspection mode in FIG. 12 is included in not the application setting but the inspection job setting in the fourth exemplary embodiment.

In step S2304, the CPU 226 obtains the settings of the inspection job stored in the RAM 227, and determines whether or not it is a print job in which one copy includes a plurality of sheets from the number 1203 of sheets per one copy. The process proceeds to step S2310 if the CPU 226 determines that it is a print job in which one copy includes a plurality of sheets, and the process proceeds to step S2305 if the CPU 226 determines that it is a print job in which one copy includes one sheet. In step S2305, the CPU 226 determines whether or not the inspection type 1210 of the settings of the inspection job stored in the RAM 227 includes the print consistency check or the data matching check job. The process proceeds to step S2306 if the CPU 226 determines that the print consistency check or the data matching check is included, and the process proceeds to step S2312 if the CPU 226 determines that the print consistency check or the data matching check is not included.

In step S2306, the CPU 226 displays a warning on the display unit 245 to present that the purge mode cannot be set. Thereafter, the process proceeds to step S2307, and the CPU 226 determines whether or not an instruction to change the inspection type has been received from the user. The process returns to step S2303 when the instruction to change the inspection type is received. On the other hand, the process proceeds to step S2308 if the instruction to change the inspection type has not been received from the user and the pull-down display has been selected. In step S2308, the CPU 226 displays the setting screen of the inspection type as illustrated in FIG. 24, for example.

Figure 24:
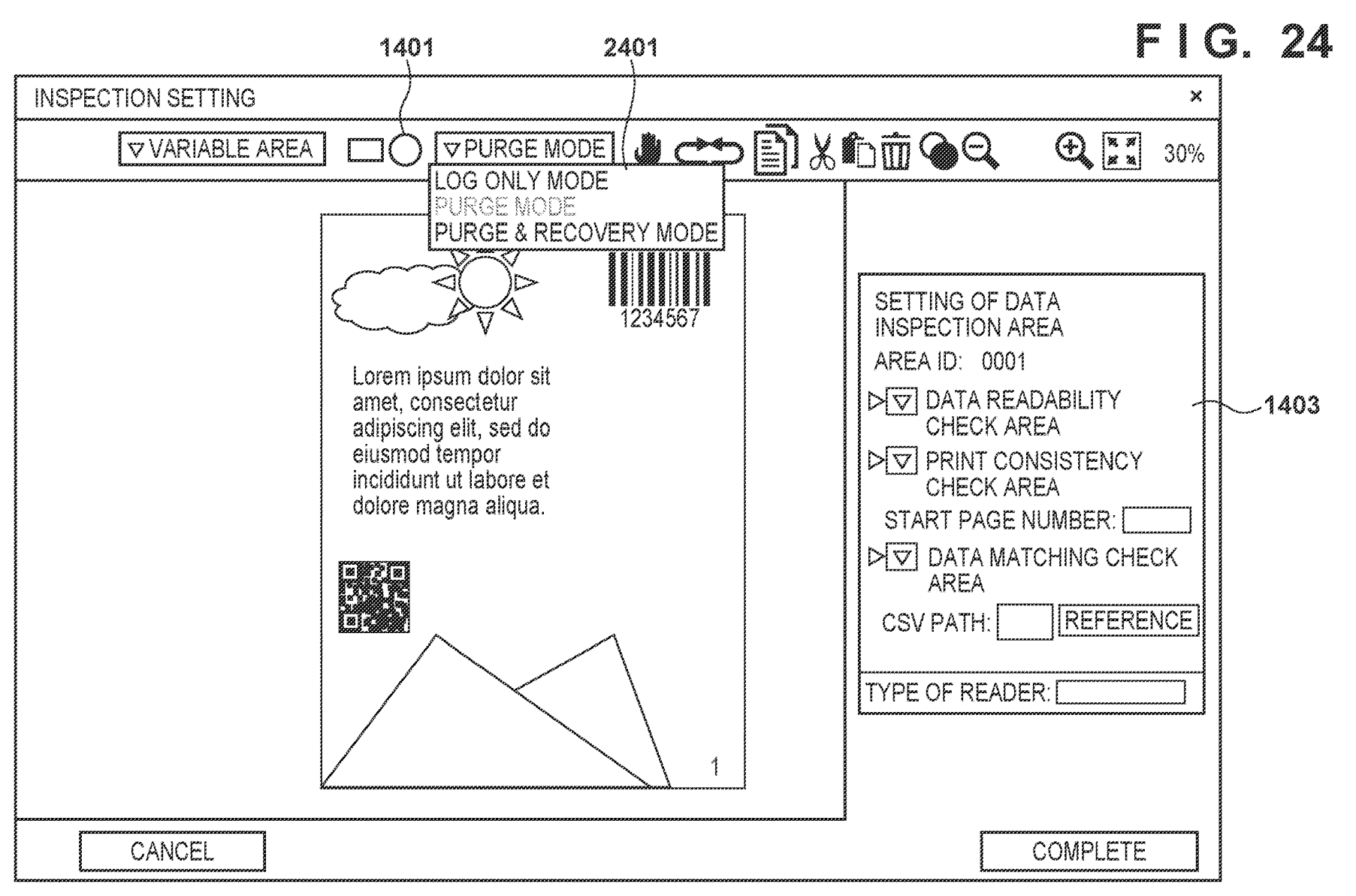

FIG. 24 depicts a view illustrating an example of a screen for setting the inspection type displayed on the display unit 245 of the inspection apparatus 108 in step S2308 of FIG. 23.

In FIG. 24, the purge mode of a setting pull-down 2401 is grayed out so as not to be selectable.

Then, the process proceeds to step S2309, and the CPU 226 waits for the log only mode or the purge & recovery mode to be selected from the setting pull-down 2401 and receives the selection, and the process proceeds to step S2313.

On the other hand, when in step S2304 the print job is one in which one copy includes a plurality of sheets, the process proceeds to step S2310, and the purge mode of the setting pull-down 2401 is grayed out so as not to be selectable as in step S2308. When the process proceeds to step S2311 and the CPU 226 receives selection of the log only mode or the purge & recovery mode from the setting pull-down 2401, the process proceeds to step S2313. Step S2313 and step S2314 are similar to step S1706 and step S1714 in FIG. 17, respectively, and therefore the description thereof is omitted.

As described above, according to the fourth exemplary embodiment, it is possible to exchange the priority order of the inspection type and the inspection mode setting.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-47530, filed Mar. 22, 2021, which is hereby incorporated by reference herein in its entirety.

What is claimed is:

1. An inspection apparatus configured to compare a reference image with a printed material that has been printed to perform inspection of the printed material, the inspection apparatus comprising:
   one or more processors and one or more memories being configured to:
   be capable of setting a purge mode, as an inspection mode of the inspection, that switches between a discharge destination of a normal printed material and a discharge destination of a printed material in which a defect was recognized and that does not perform a recovery printing of the printed material in which the defect was recognized; and
   exclusively control an inspection job of inspecting a printed material printed by a in which one copy includes a plurality of printed materials or an inspection job of inspecting printed materials having a sequential order, and a setting of the purge mode.

2. The inspection apparatus according to claim 1, wherein the one or more processors and the one or more memories are further configured to:
   set an inspection mode of the inspection,
   wherein in the control, in a case where the inspection mode that has been set is the purge mode, a warning is issued in a case that the inspection job of inspecting the printed material in which one copy includes a plurality of printed materials or the inspection type of inspecting printed materials having the sequential order is designated.

3. The inspection apparatus according to claim 2, wherein the one or more processors and the one or more memories are further configured to:
   in the control, display a screen prompting performing of resetting of the inspection mode in a case where the inspection mode is the purge mode, and the inspection job of inspecting the printed material in which one copy includes the plurality of printed materials and the inspection type of inspecting printed materials having the sequential order are designated.

4. The inspection apparatus according to claim 2,
   wherein the one or more processors and the one or more memories are further configured to, in the control, in a case where the set inspection mode is the purge mode, not allow to set the inspection job of inspecting printed materials having the sequential order.

5. The inspection apparatus according to claim 2, wherein the one or more processors and the one or more memories are further configured to:
   perform inspection of the printed material for each inspection job,
   wherein in setting of the inspection mode, an inspection mode of the inspection is set for the each inspection job.

6. The inspection apparatus according to claim 2,
wherein the one or more processors and the one or more memories are further configured to, in the control, issue the warning and display a screen for setting an inspection mode of the inspection, and
wherein the screen is a screen in which the purge mode cannot be set as the inspection mode.

7. The inspection apparatus according to claim 1, wherein an inspection job of inspecting printed materials having the sequential order performs a print consistency check of inspecting whether characters printed on the printed material are in a preset order, or a data matching check of inspecting whether data of the reference image and data of the printed material to be inspected match.

8. The inspection apparatus according to claim 1, wherein in a case where the inspection job is not an inspection job of inspecting printed materials having a sequential order, the control includes a readability check of inspecting whether or not data of the printed material can be identified.

9. The inspection apparatus according to claim 1, wherein the one or more processors and the one or more memories are further configured to:
be capable of setting a same purge mode, as an inspection mode of the inspection, that does not switch between a discharge destination of a normal printed material and a discharge destination of a printed material in which a defect was recognized, and
in the control, not exclusively control an inspection job of inspecting a printed material in which one copy includes a plurality of printed materials or an inspection job of inspecting printed materials having the sequential order, and the same purge mode.

10. The inspection apparatus according to claim 1, wherein the one or more processors and the one or more memories are further configured to:
be capable of setting a recovery purge mode that switches between a discharge destination of a normal printed material and a discharge destination of a printed material in which a defect was recognized, and perform a recovery printing of the printed material in which the defect was recognized, and
in the control, not exclusively control an inspection job of inspecting a printed material in which one copy includes a plurality of printed materials or an inspection job of inspecting printed materials having the sequential order, and the recovery purge mode.

11. The inspection apparatus according to claim 1, wherein the one or more processors and the one or more memories are further configured to, in the control, determine whether the setting of the inspection mode is the purge mode or not.

12. The inspection apparatus according to claim 3, wherein the one or more processors and the one or more memories are further configured to, in the control, in case where the inspection mode is determined not to be the purge mode, set the designated inspection mode as an inspection mode of the inspection apparatus.

13. A method of controlling an inspection apparatus that compares a reference image with a printed material that has been printed to perform inspection of the printed material, the control method comprising:
being capable of setting a purge mode, as an inspection mode of the inspection, that switches between a discharge destination of a normal printed material and a discharge destination of a printed material in which a defect was recognized and that does not perform a recovery printing of the printed material in which the defect was recognized; and
exclusively controlling an inspection job of inspecting a printed material in which one copy includes a plurality of printed materials or an inspection job of inspecting a printed material having a sequential order, and a setting of the purge mode.

14. The method according to claim 13, further comprising:
setting an inspection mode of the inspection,
wherein in the controlling, in a case where the inspection mode that has been set is the purge mode, a warning is issued in a case that an inspection job of inspecting a printed material in which one copy includes a plurality of printed materials or an inspection type of inspecting printed materials having a sequential order is designated.

15. The method according to claim 14, wherein in the controlling, a screen prompting performing of resetting of the inspection mode is displayed in a case where the inspection mode is the purge mode, and the inspection job of inspecting the printed material in which one copy includes a plurality of printed materials and the inspection type of inspecting printed materials having a sequential order are designated.

16. The method according to claim 13, further comprising:
in the control, in a case where the set inspection mode is the purge mode, not allowing to set the inspection job of inspecting printed materials having the sequential order.

17. A non-transitory computer-readable storage medium storing a program for causing a processor to execute a method of controlling an inspection apparatus that compares a reference image with a printed material that has been printed to perform inspection of the printed material, the control method comprising:
being capable of setting a purge mode, as an inspection mode of the inspection, that switches between a discharge destination of a normal printed material and a discharge destination of a printed material in which a defect was recognized and that does not perform a recovery printing of the printed material in which the defect was recognized; and
exclusively controlling an inspection job of inspecting a printed material in which one copy includes a plurality of printed materials or an inspection job of inspecting a printed material having a sequential order, and a setting of the purge mode.

* * * * *